United States Patent
Lin et al.

(10) Patent No.: US 10,981,624 B2
(45) Date of Patent: Apr. 20, 2021

(54) HUB APPARATUS AND ASSOCIATED CHARGING APPARATUS AND SYSTEMS

(71) Applicant: Gogoro Inc., Hong Kong (CN)

(72) Inventors: Shih-Yuan Lin, Taipei (TW); Yu-Se Liu, New Taipei (TW); Jun-Chieh Hung, Taipei (TW); Liang-Yi Hsu, Miaoli (TW)

(73) Assignee: Gogoro Inc., Hong Kong (CN)

( * ) Notice: Subject to any disclaimer, the term of this patent is extended or adjusted under 35 U.S.C. 154(b) by 204 days.

(21) Appl. No.: 16/207,058

(22) Filed: Nov. 30, 2018

(65) Prior Publication Data

US 2019/0315241 A1    Oct. 17, 2019

Related U.S. Application Data

(60) Provisional application No. 62/593,854, filed on Dec. 1, 2017, provisional application No. 62/650,895, filed on Mar. 30, 2018.

(51) Int. Cl.
*B62M 6/60* (2010.01)
*B62M 6/50* (2010.01)
(Continued)

(52) U.S. Cl.
CPC .............. *B62M 6/60* (2013.01); *B60B 1/003* (2013.01); *B60B 27/04* (2013.01); *B60L 50/20* (2019.02);
(Continued)

(58) Field of Classification Search
CPC ..................................................... B62M 6/60
(Continued)

(56) References Cited

U.S. PATENT DOCUMENTS 502,500 A    8/1893    Perkins
748,684 A    1/1904    Andersen et al.
(Continued)

FOREIGN PATENT DOCUMENTS

CN    204937397 U    1/2016
EP    1503933 A0    11/2003
(Continued)

OTHER PUBLICATIONS

Office Action Received for co-pending Taiwanese Patent Application No. TW 107143123; Applicant: Gogoro Inc., dated Oct. 18, 2019, 12 pages.
(Continued)

*Primary Examiner* — Suchin Parihar
(74) *Attorney, Agent, or Firm* — Perkins Coie LLP

(57) ABSTRACT

The present disclosure relates to a hub apparatus and associated charging systems. In some embodiments, the hub apparatus includes (1) a housing assembly defining an internal space; (2) a shaft positioned to extend through the housing assembly; (3) a stator assembly fixedly coupled to the shaft; (4) a side cover fixedly coupled to the shaft and rotatably coupled to the housing assembly, the side cover having a base portion and a mating portion extending from the base portion; and (5) a pair of first connectors positioned through the mating portion. Each of the first connectors comprising a terminal end and a contact portion. The terminal end is electrically coupled to a battery assembly via a wire bundle fixedly coupled to the side cover. The contact portion is configured to electrically couple to an external power source so as to charge the battery assembly through a wired connection.

21 Claims, 22 Drawing Sheets

(51) Int. Cl.

| | |
|---|---|
| H02K 7/00 | (2006.01) |
| H02K 5/10 | (2006.01) |
| H02K 7/12 | (2006.01) |
| H02K 11/00 | (2016.01) |
| H02K 21/22 | (2006.01) |
| B62M 6/65 | (2010.01) |
| B62M 6/90 | (2010.01) |
| B60B 1/00 | (2006.01) |
| H02K 11/24 | (2016.01) |
| B60L 50/20 | (2019.01) |
| B60L 50/60 | (2019.01) |
| B60B 27/04 | (2006.01) |
| H02K 11/33 | (2016.01) |
| B60L 53/16 | (2019.01) |
| H02K 1/18 | (2006.01) |
| B60L 53/12 | (2019.01) |
| B60L 53/30 | (2019.01) |
| H02K 1/27 | (2006.01) |
| H02K 11/30 | (2016.01) |
| B60B 1/04 | (2006.01) |
| H02K 7/14 | (2006.01) |

(52) U.S. Cl.
CPC .............. *B60L 50/60* (2019.02); *B60L 50/66* (2019.02); *B60L 53/12* (2019.02); *B60L 53/16* (2019.02); *B60L 53/305* (2019.02); *B62M 6/50* (2013.01); *B62M 6/65* (2013.01); *B62M 6/90* (2013.01); *H02K 1/187* (2013.01); *H02K 5/10* (2013.01); *H02K 7/006* (2013.01); *H02K 7/12* (2013.01); *H02K 11/0094* (2013.01); *H02K 11/24* (2016.01); *H02K 11/33* (2016.01); *H02K 21/22* (2013.01); *B60B 1/042* (2013.01); *B60L 2200/12* (2013.01); *B60L 2220/44* (2013.01); *B60L 2240/42* (2013.01); *H02K 1/2786* (2013.01); *H02K 7/14* (2013.01); *H02K 11/30* (2016.01); *H02K 2211/03* (2013.01)

(58) Field of Classification Search
USPC ........................................................ 320/104
See application file for complete search history.

(56) References Cited

U.S. PATENT DOCUMENTS

| | | | |
|---|---|---|---|
| 4,019,782 | A | 4/1977 | Reppert |
| 5,795,036 | A | 8/1998 | Campagnolo |
| 6,057,657 | A | 5/2000 | Kitamura |
| 6,617,746 | B1 | 9/2003 | Maslov et al. |
| 6,765,323 | B2 | 7/2004 | Takano et al. |
| 6,787,951 | B2 | 9/2004 | Maslov et al. |
| 7,156,196 | B2 | 1/2007 | Katsaros |
| 7,182,410 | B2 | 2/2007 | Fukui |
| 7,273,259 | B2 | 9/2007 | Fukui |
| 7,284,631 | B2 | 10/2007 | Rizzetto |
| 7,370,720 | B2 | 5/2008 | Kokatsu et al. |
| 7,375,450 | B2 | 5/2008 | Tanaka et al. |
| 8,960,354 | B2 | 2/2015 | Lin et al. |
| 9,669,897 | B2 | 6/2017 | Zanfei |
| 9,821,597 | B2 | 11/2017 | Koshiyama et al. |
| 9,925,826 | B2 | 3/2018 | Koshiyama et al. |
| 9,962,991 | B2 | 5/2018 | Koshiyama et al. |
| 10,500,950 | B2 | 12/2019 | Wu |
| 2002/0156577 | A1 | 10/2002 | Flick |
| 2003/0062782 | A1 | 4/2003 | Takano et al. |
| 2004/0164624 | A1 | 8/2004 | Suzuki et al. |
| 2007/0252452 | A1 | 11/2007 | Ishimoto et al. |
| 2010/0090440 | A1 | 4/2010 | Reichstetter et al. |
| 2011/0042156 | A1* | 2/2011 | Vincenz ................ B62K 19/30 180/206.5 |
| 2011/0133542 | A1 | 6/2011 | Ratti et al. |
| 2011/0304235 | A1 | 12/2011 | Hashiba et al. |
| 2012/0161495 | A1 | 6/2012 | Ito |
| 2012/0169154 | A1 | 7/2012 | Curodeau |
| 2013/0049549 | A1 | 2/2013 | Folmli et al. |
| 2013/0068549 | A1 | 3/2013 | Laprade |
| 2013/0207448 | A1 | 8/2013 | Koshiyama et al. |
| 2013/0328512 | A1 | 12/2013 | Ozaki |
| 2014/0035347 | A1 | 2/2014 | Zanfei et al. |
| 2014/0097672 | A1* | 4/2014 | Takemura ............. H02J 7/0063 307/9.1 |
| 2015/0133253 | A1 | 5/2015 | Huang |
| 2016/0009169 | A1* | 1/2016 | Biderman ............. B60L 3/0046 701/22 |
| 2016/0014252 | A1 | 1/2016 | Biderman et al. |
| 2016/0068223 | A1 | 3/2016 | Zanfei |
| 2016/0075177 | A1* | 3/2016 | Biderman ............... B60L 58/10 301/6.5 |
| 2016/0075225 | A1* | 3/2016 | Aich ........................ B62M 6/90 180/206.6 |
| 2016/0082772 | A1* | 3/2016 | Biderman ............... B60Q 9/00 301/6.5 |
| 2016/0149167 | A1* | 5/2016 | Jung ...................... H01M 2/02 429/94 |
| 2016/0159435 | A1* | 6/2016 | Yehuda ................. B60W 10/08 180/220 |
| 2016/0243927 | A1* | 8/2016 | Biderman ............. B60L 3/0061 |
| 2016/0280300 | A1* | 9/2016 | Latzke ..................... B62J 6/14 |
| 2017/0036735 | A1* | 2/2017 | Douglas ................ B62K 19/08 |
| 2017/0297616 | A1 | 10/2017 | Kikuchi et al. |
| 2017/0368943 | A1* | 12/2017 | Von Novak, III ....... B62M 6/90 |
| 2018/0111487 | A1* | 4/2018 | Xu ............................. H02J 7/32 |
| 2019/0173399 | A1 | 6/2019 | Lin et al. |
| 2019/0185106 | A1 | 6/2019 | Lin et al. |
| 2019/0202526 | A1 | 7/2019 | Lin et al. |
| 2020/0114753 | A1* | 4/2020 | Biderman ............. G05D 1/0291 |

FOREIGN PATENT DOCUMENTS

| | | |
|---|---|---|
| JP | 2012-176644 A | 9/2012 |
| JP | 2017-105416 A | 6/2017 |
| TW | 243568 | 3/1995 |
| TW | M373593 U1 | 2/2010 |
| TW | 201043520 A | 12/2010 |
| WO | 2003097437 A1 | 11/2003 |
| WO | 2012123802 A1 | 9/2012 |
| WO | 2015154046 A1 | 10/2015 |

OTHER PUBLICATIONS

Office Action Received for co-pending Japanese Patent Application No. JP2018-224713; Applicant: Gogoro Inc., dated Dec. 3, 2019, 8 pages.

Non-Final Office Action received for co-pending U.S. Appl. No. 16/207,068, Applicant: Gogoro Inc., dated Mar. 20, 2020, 18 pages.

European Search Report Received for European Patent Application No. EP18209470.6; Applicant: Gogoro Inc., dated May 13, 2019, 4 pages.

India Exam Report received for Indian Application No. 201814045321; Applicant: Gogoro, Inc., dated Jun. 3, 2020, 6 pages.

* cited by examiner

US 10,981,624 B2

HUB APPARATUS AND ASSOCIATED CHARGING APPARATUS AND SYSTEMS

CROSS-REFERENCE TO RELATED APPLICATION

The present application claims the benefit of and priority to U.S. Provisional Applications No. 62/593,854, filed Dec. 1, 2017, and No. 62/650,895, filed Mar. 30, 2018, which are incorporated herein by reference in their entirety.

TECHNICAL FIELD

The present technology is directed to a hub apparatus (or a hub motor) and associated charging systems. More particularly, the present technology is directed to a hub apparatus configured to be charged via a wired charging system and/or a wireless charging system.

BACKGROUND

A charging process is important for electric vehicles. Some conventional charging systems require users to charge their electric vehicles at designated charging stations. Sometimes it can be troublesome for users to locate available charging stations. In addition, conventional charging systems can be interrupted when the connection between the electric vehicle and the charging station is accidentally "broken" (e.g., a power cord between the electric vehicle and the charging station becomes disconnected if a person accidentally trips on the power cord). Therefore, there is a need for improved systems and methods for charging electric vehicles.

Figure 1:
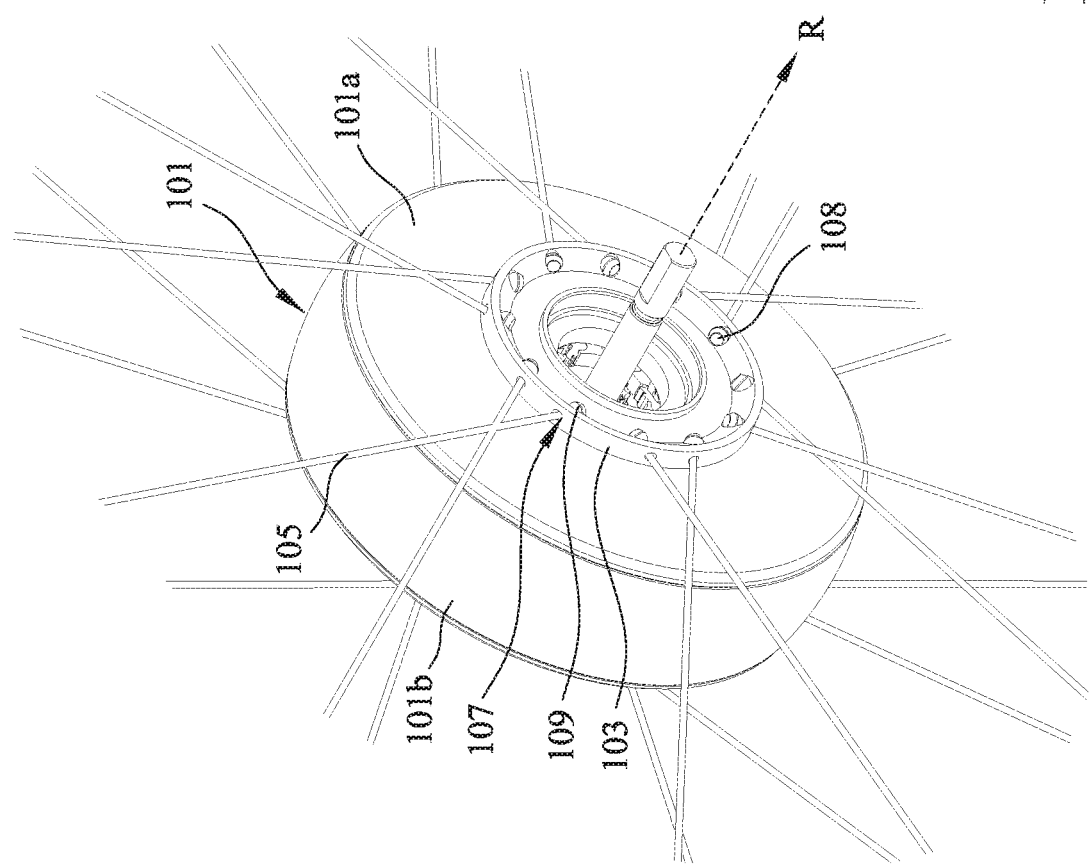
FIG. 1 illustrate a hub apparatus in accordance with embodiments of the present technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

The present technology is directed to a charging apparatus or system that can charge a hub apparatus (or a hub motor) via one or both of a wired and wireless connections. The present technology is also directed to methods for managing a charging process for the hub apparatus. The hub apparatus of the present technology is configured to rotate a wheel/rim of a vehicle (e.g., a bicycle, a tricycle, a scooter, a powered wheel chair, a cart, etc.). The hub apparatus includes a rotor assembly, a shaft, and a stator assembly. The stator assembly is fixedly coupled to the shaft, and the shaft extends through the rotor assembly. The rotor assembly can be rotated relative to the stator assembly and the shaft. In some embodiments, the hub apparatus can be considered as an electric motor. The rotor assembly of the hub apparatus is coupled to the wheel/rim of the vehicle, and the shaft is fixedly coupled to the vehicle (e.g., to a vehicular structure such as a frame). The hub apparatus is configured to rotate the wheel either with or without human power to move (or at least facilitate the movement of) the vehicle.

In some embodiments, the present wired/wireless charging systems for a hub apparatus can be implemented in one structure. For example, the wired/wireless charging systems can be implemented as a charging structure (e.g., having a charging stand and a charging head; e.g., FIG. 12).

Another aspect of the present disclosure is a charging system for charging a hub apparatus. The charging system includes (1) a charging stand; and (2) a charging head coupled to the charging stand. The charging head is formed with an opening configured to receive a mating portion of a side cover of the hub apparatus. In some embodiments, a vehicular frame is fixedly coupled to a shaft of the hub apparatus. The charging head is configured to fittingly positioned between the vehicular frame and the side cover of the hub apparatus such that the hub apparatus is capable of being charged by the charging head via one or both of wireless and wired connections.

Advantages of the present technology include, for example, (1) it provides a hub apparatus that can be charged with one or both of a wired and a wireless connections; (2) the hub apparatus can be securely attached to a charging stand during a charging process; (3) the present technology can effectively manage the charging process of the hub apparatus by selecting most effective way to charge the hub apparatus (e.g., based on the characteristics of a battery assembly in the hub apparatus, available power to support the charging process, etc.).

FIG. 1 is an isometric view of a hub apparatus or hub assembly 100 in accordance with embodiments of the present technology. As shown in FIG. 1, the hub apparatus 100 includes an outer housing (or housing) and a hub flange (or ring structure) 103 configured to accommodate multiple spokes 105 (e.g., the other end of the spoke 105 can be coupled to a front/back wheel of a bike).

In some embodiments, the housing can be assembled from multiple housing components. In some embodiments, the housing can include a first housing component 101 and a second housing component 201 coupled to each other and together form an inner/interior/internal space to accommodate elements of the hub apparatus 100. In some embodiments, for example, the first housing component 101 can include a sidewall 101a and an outer rim 101b extending around the outer circumference of the sidewall 101a. The outer rim 101b has a height that defines the interior space in the first housing component 101.

As shown in FIG. 1, the first housing component 101 is formed with a side opening in its center, allowing a shaft (e.g., shaft 209 in FIG. 2a) to pass through. The opening is configured to accommodate a side cover 321 (see e.g., FIG. 3). The side cover 321 is fixedly coupled to the shaft 209 and accordingly does not rotate with the housing. In some embodiments, a bearing can be positioned between the side cover 321 and the housing, which enables the housing to rotate relative to the side cover 321 (and the shaft 209). In some embodiments, an oil seal can be positioned between the housing and the side cover 321.

Figure 2A:
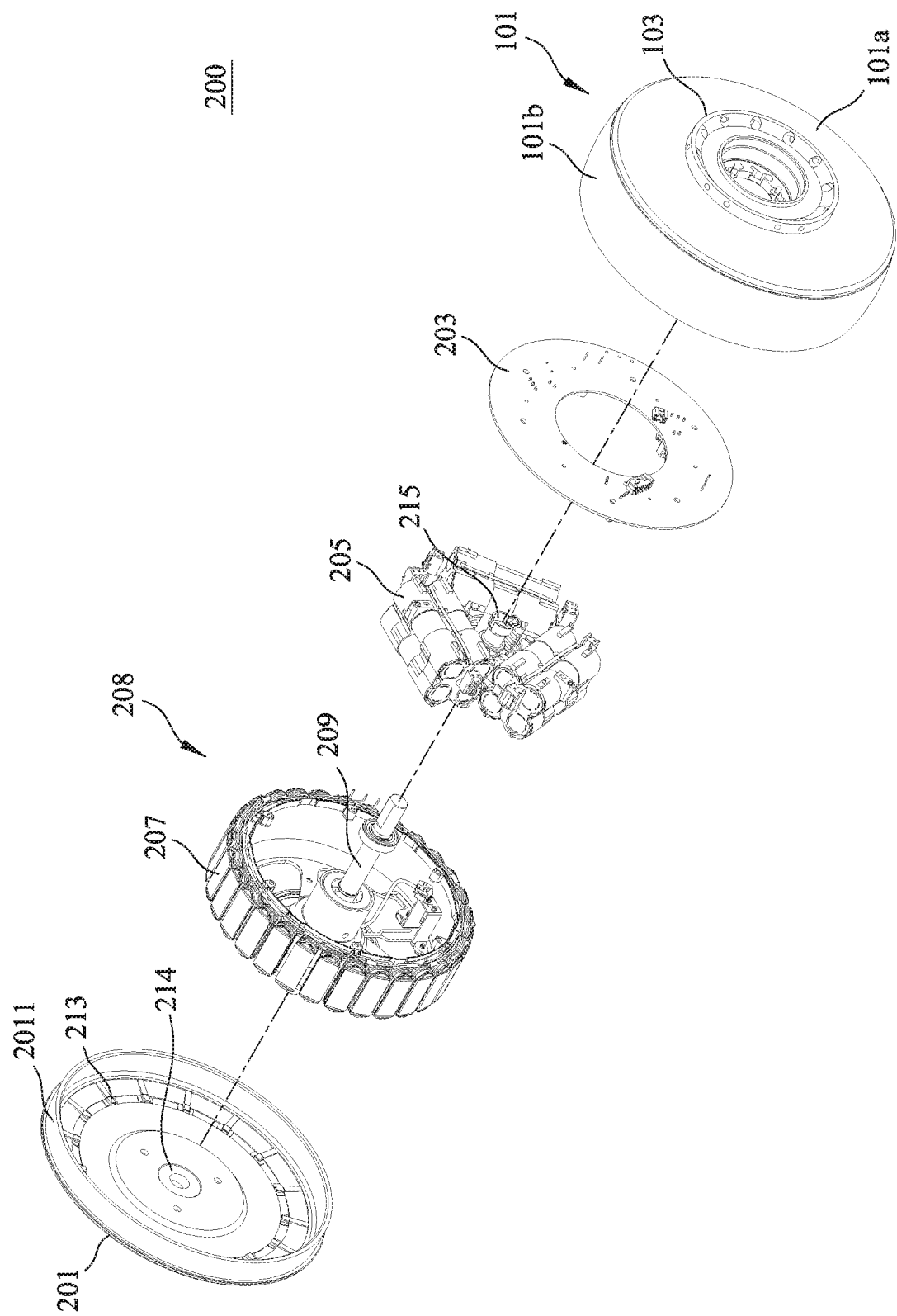
FIGS. 2a and 2b are partially exploded views illustrating a hub apparatus in accordance with embodiments of the present technology.

As shown in FIG. 1, the hub flange 103 or ring structure is coupled to, or integrally formed with, the sidewall 101a. The hub flange 103 extends outwardly from a surface of the sidewall 101a at a position radially outward from a center point of the first housing component 101. A second housing component 201 (e.g., a lid or cap; FIG. 2a) encloses the open end of the first housing component 101 with a structure that fits underneath the outer rim 101b of the first housing component 101. In some embodiments, the second housing component 201 can include an insertion flange 2011 formed thereon. The insertion flange 2011 is configured to couple the second housing component 201 to the first housing component 101 (e.g., to be inserted into a gap, to be discussed below with reference to FIG. 2b). In some embodiments, a bearing or oil seal 214 (FIG. 2a) can be positioned between the second housing component 201 and the shaft 209. The bearing 214 is configured to facilitate the relative rotation between the second housing component 201 and the shaft 209.

As best shown in FIG. 2a, fitted into the interior space of the housing are a main circuit board 203, a battery assembly 205, and a coil assembly 207 that are fixedly directly or indirectly to an axle or shaft 209 passing through the center of the hub assembly 100. In such embodiments, the first housing component 101 and a number of magnets 218 (not visible in FIG. 1 or 2a; see e.g., FIG. 2b) on the interior of the first housing component 101 together form a rotor assembly. Further, the main circuit board 203, the battery assembly 205, and the coil assembly 207 together can be considered as the stator assembly 208.

When an electric current provided by battery packs of the battery assembly 205 passes through coils (or coil assembly 207) of the stator assembly 208, magnetic fields are generated and accordingly move the magnets of the rotor assembly to rotate the rotor assembly about axis R (or shaft 209). In some embodiments, an additional battery pack can be positioned external to the hub apparatus 100 as a backup, supplementary power supply. As a result, the housing and a wheel attached to the housing via the spokes 105 are also rotated to move a scooter, a bicycle, or a vehicle.

In the illustrated embodiment, the hub flange 103 or ring structure and the sidewall 101a are concentrically positioned. The hub flange 103 is positioned around a center point of the sidewall 101a. In other embodiments, the hub flange 103 can be positioned at different radial locations of the sidewall 101a (e.g., closer to the outer edge of the first housing component 101 or nearer to the center point). As shown, the hub flange 103 includes a plurality of openings 107 configured to receive the ends of the multiple spokes 105, respectively.

Each spoke 105 has an outer end configured to couple to a wheel/rim structure (not shown in FIG. 1) and an inner, flared (or spherical) end 109 that seats against a correspondingly shaped recess formed in an interior circumference of the hub flange 103. In one embodiment, a spherical washer 108 is fitted over the spoke 105 and rests against the flared end of the spoke 105. Correspondingly shaped spherical recesses are formed in the hub flange 103 to receive the spherical washer 108 and seat the spoke 105 under tension.

In addition, because the spherical washer 108 allows the spoke 105 to be in contact with the hub flange 103 at various angles, the present structure (1) improves manufacturing flexibility (e.g., they are easy to fit and have a higher error tolerance) and (2) provides additional durability when operating the hub apparatus 100 at least because the spokes 105 are not rigidly secured to the hub flange 103 at their ends.

FIG. 2a is an exploded view showing a hub apparatus 200 in accordance with embodiments of the present technology. The hub apparatus 200 includes the first housing component 101 (which has the sidewall 101a and the outer rim 101b) and the lid or cap or second housing component 201. On its outer surface, the first housing component 101 includes the hub flange 103 configured to couple to a wheel/rim structure via multiple spokes. On its inner surface, the second housing component 201 includes multiple protrusions or stopping bumps 213 configured to stop the relative rotation (e.g., by cooperating with a locking device 700 or a motor locking device discussed below with reference to FIG. 7) between the first housing component 101 and the coil assembly 207. The multiple protrusions or stopping bumps 213 can be named as "engaging portions." In some embodiments, the first housing component 101 and the second housing component 201 together form a housing assembly.

In some embodiments, the engaging portion can be implemented as a recess (e.g., configured to receive the locking device 700), a hook (e.g., configured to engage the locking device 700), and other suitable components. In some embodiments, the engaging portions are located either on the interior surface of either the sidewall 101a of the first housing component 101, and/or on the interior surface of the second housing component 201. The engaging portion and the locking device 700 together form a "locking mechanism" or "locking system" for the hub apparatus 200.

In the illustrated embodiment, multiple magnets 218 (see e.g., FIG. 2b) are circumferentially positioned on the inner surface of the outer rim 101b, and accordingly the first housing component 101 and the magnets 218 together act as a "rotor assembly" or a rotor in this embodiment.

The main circuit board 203 is configured to carry one or more controllers, controlling circuits, logic, sensors, wiring, and/or other suitable components necessary to apply current to the coils or to rotate the housing. In some embodiments, the main circuit board 203 can carry an electrical control unit (ECU) of a vehicle. In some embodiments, the main circuit board 203 can carry a power controller (not shown) configured to control the power output of the hub apparatus 200. The power output can be measured in form of the torque force of rotation between the rotor assembly (the housing with the magnets 218 positioned therein or on its inner surface) and the stator assembly 208 or by the watts expended by the motor. In some embodiments, the main circuit board 203 can carry drive circuitry configured to manage the power from the battery assembly 205 (e.g., to supply a three-phase alternating current). In some embodiments, the drive circuitry and the power controller can be integrated in one component (e.g., a motor control unit, MCU).

The battery assembly 205 can include multiple battery packs. In the illustrated embodiments, the battery assembly 205 includes three battery packs laterally positioned adjacent to the main circuit board 203. In other embodiments, the battery assembly 205 can have different numbers of battery packs arranged in various ways. In some embodiments, the battery assembly 205 can include multiple battery packs positioned to form a polygon (e.g., a triangle, a rectangle, a pentagon, a hexagon, etc.) in a reference plane generally perpendicular to the shaft 209 (e.g., in such embodiments, the longitudinal direction of the battery packs lies in the reference plane). In some embodiments, the battery pack can be positioned at equal angles around the shaft 209. In some embodiments, the battery packs can be arranged based on the size/shape of the battery packs so as to be fitted into the coil assembly 207. For example, the battery packs can have orientations different from those shown in FIG. 2a.

In some embodiments, the battery assembly 205 can be controlled or managed by a battery management system (BMS). The BMS can include one or more sensors configured to monitor the status of a battery. In some embodiments, the BMS can be positioned on the main circuit board 203. In some embodiments, the battery packs (and battery cells therein) can be connected in series or in parallel, depending on various needs or actual designs.

In some embodiments, the battery assembly 205 can be coupled to one or more battery memories positioned on the main circuit board 203 and configured to store battery-related information (e.g., battery usage information, battery operating instructions (such as charging/discharging rates or other instructions that may vary from different batteries), battery firmware, battery status, etc.). In some embodiments, the battery memory can also be configured to store vehicle information (e.g., an operating temperature in the hub apparatus 200) or user information (e.g., driving/riding history, habits, etc.). In some embodiments, the battery memories can be positioned inside a battery housing of the battery assembly 205.

In some embodiments, the battery assembly 205 can be positioned inside the coil assembly 207 such that the hub apparatus 200 can have a compact design. Benefits of positioning the battery assembly 205 inside the coil assembly 207 include, for example, (1) the coil assembly 207 can protect the battery assembly 205, for example, from impacts from the outside; and (2) this arrangement can at least partially prevent or impede the battery assembly 205 from interference/influence of the magnetic field generated by the magnets of the rotor assembly.

The axle or shaft 209 is fixedly coupled to the main circuit board 203, the battery assembly 205, and the coil assembly 207. The shaft 209 can be coupled to a vehicular body (e.g., a frame, a chassis, structural parts, etc.) and support the same. During operation, the housing and the wheel attached thereto (via the spokes coupled to the hub flanges) can rotate relative to the shaft 209 to move the vehicular body. In some embodiments, the shaft 209 can be coupled to a front wheel component (e.g., a front wheel fork) or a rear wheel component (e.g., a rear wheel frame).

In some embodiments, the hub apparatus 200 can include one or more waterproof components (e.g., O-rings) configured to make the hub apparatus 200 waterproof. In some embodiments, the waterproof component can be positioned at one or more locations such as a location adjacent to the shaft 209, a location adjacent to a component (e.g., a torque sensor) of the hub apparatus 200, etc. In some embodiments, the waterproof component can also be positioned between the first housing component 101 and the second housing component 201, at one or both ends of the shaft 209, between the side cover 321 and the first housing component 101 and the second housing component 201, etc. so as to enhance the overall waterproof capability of the hub apparatus 200.

Figure 2B:
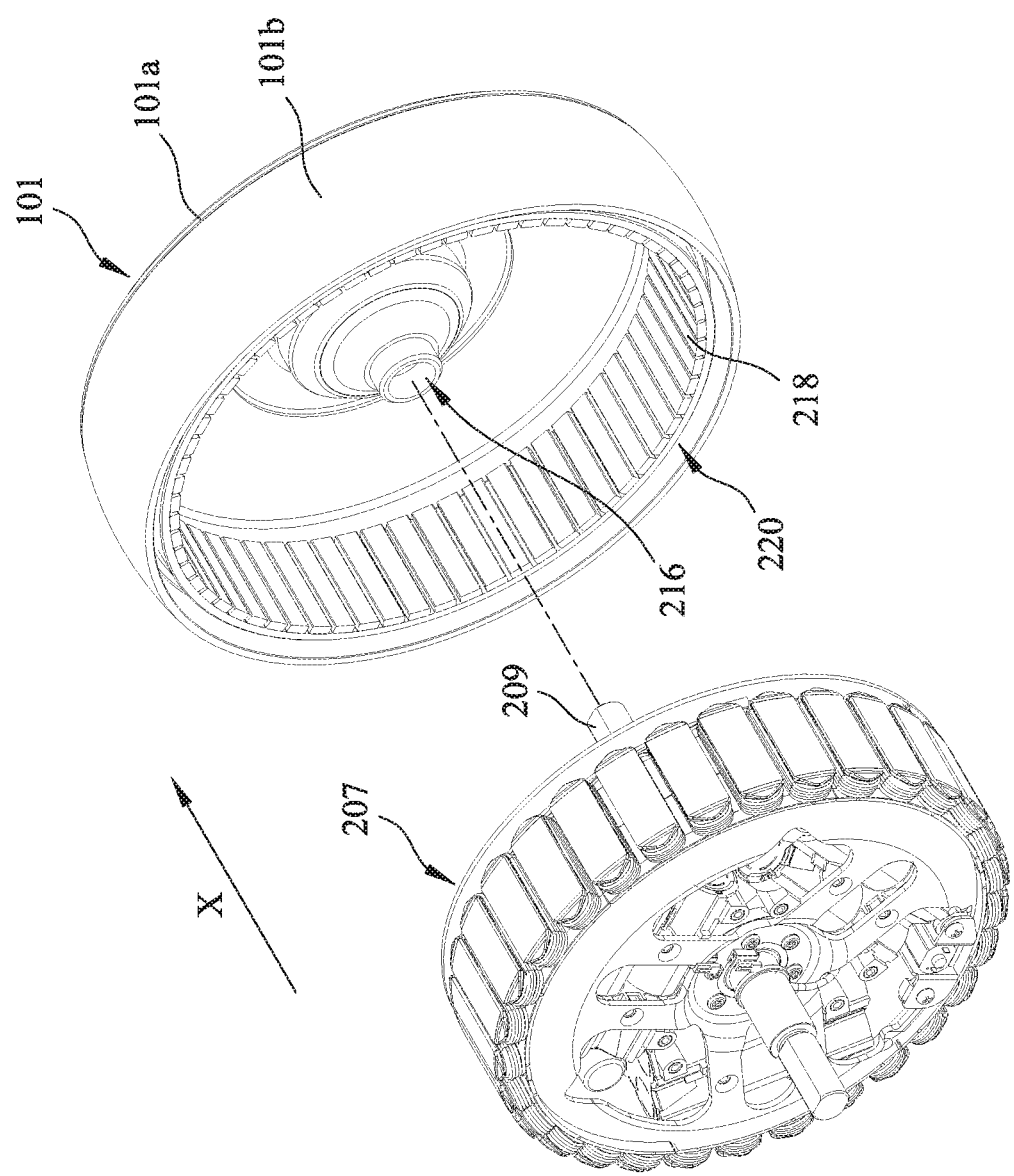

FIG. 2b illustrates how the stator assembly 208 is fitted within the first housing component 101. As shown, the stator assembly 208 is coupled to the shaft 209 and then the shaft 209 is positioned to pass through a center opening 216 of the first housing component 101 (in direct X, as indicated). As shown, multiple permanent magnets 218 are positioned on the interior or inner surface of the first housing component 101. During operation, the multiple permanent magnets 218 and the first housing component 101 can rotate (as a rotor assembly) relative to the stator assembly 208.

In some embodiments, the magnets 218 can be coupled to the first housing component 101 via a connecting structure (e.g., a metal ring). In some embodiments, the magnets 218 can be coupled to the sidewall 101a of the first housing component 101. In some embodiments, the magnets 218 can be coupled to the outer rim 101b of the first housing component 101.

As shown in FIG. 2b, a gap 220 is formed between the magnets 218 and the first housing component 101. The gap 220 is configured to receive the insertion flange 2011 of the second housing component 201 (FIG. 2a), such that the second housing component 201 and the first housing component 101 are fixedly coupled.

Figure 3:
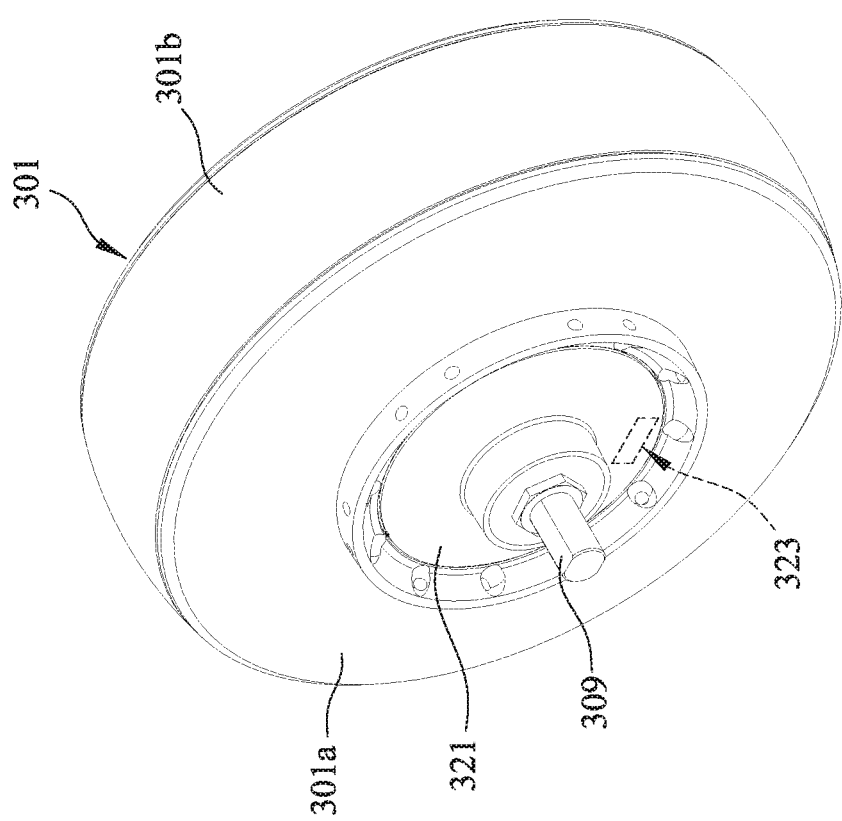
FIG. 3 illustrate a hub apparatus and a side cover in accordance with embodiments of the present technology.

FIG. 3 is an isometric view of a side cover (or a side plug) 321 coupled to the hub apparatus 300. The side cover 321 is fixedly coupled to the shaft 209 (and therefore the side cover 321 is not rotating). The side cover 321 is configured to protect the components inside a housing assembly 301. In some embodiments, the side cover 321 can be used to carry a wireless communication/charging component 323. In some embodiments, the wireless communication component 323 can include wireless inductive charging component (e.g., a radio frequency (RF)) component). In some embodiments, the wireless communication/charging component 323 can be used to charge a battery assembly (e.g., battery assembly 205) by communicating with an external wireless charger (which is further coupled to an external power source). As discussed in detail below with reference to FIGS. 4-6, the side cover 321 can also carry components (e.g., contact portions 337) for a wired charging connection.

Since the side cover 321 does not rotate relative to the housing assembly 301, the wireless communication/charging component 323 carried by the side cover 321 does not rotate either. Therefore, the location of the wireless communication/charging component 323 (e.g., at the bottom of the side cover 321) remains unchanged. By this arrangement, the wireless communication/charging component 323 can be conveniently located or accessed for charging/communicating purposes.

For example, if the wireless communication/charging component 323 were to rotate with a wheel/housing, it would be relatively difficult for a user to align an external wireless charger with the wireless communication/charging component 323, at least because it's hard to predict the location of the wireless communication/charging component 323 when it stops (e.g., it can be at the top, the sides, or the bottom of the wheel/housing). Therefore, the present arrangement provides a convenient, easy-to-use arrangement for the hub apparatus 300 to communicate with, or be charged by, an external charging device.

Advantages of the side cover 321 include that, for example, it provides a space that is independent from the internal space of the housing assembly 301. Since the housing assembly 301 is configured to rotate, communication devices/components/modules, such as a Wi-Fi or Bluetooth module, may have interrupted communications in the internal space of the housing assembly 301. In addition, since the housing assembly 301 is a load-bearing device/component, it can be made of a metallic material which may block or impede the communications of such communication modules. The independent space created by the side cover 321 allows a communication device/component/module to be installed therein and attached to or carried by a stationary or "non-rotating" component. In some embodiments, the side cover can be made of a material that does not substantially impede or interfere the wireless communication associated with the present system. For example, the side cover 321 can be made of plastic. Further, by this arrangement, the housing assembly 301 can have an "intact" outer structure with sufficient structural rigidity (e.g., to bear the load of a vehicular frame or a vehicle).

Figure 4:
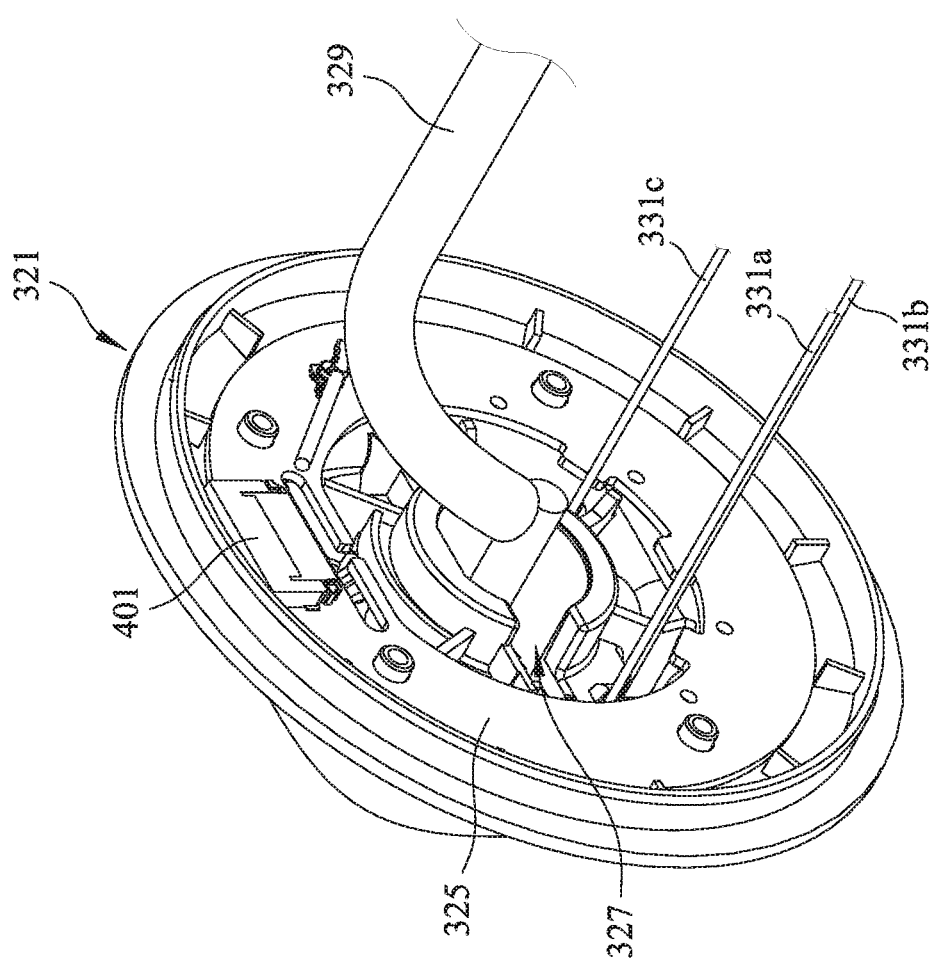
FIG. 4 is a partially isometric view of a side cover and related components in accordance with an embodiment of the present technology.

FIG. 4 is an isometric view of the inside of the side cover 321 and related components in accordance with an embodiment of the present technology. As shown, the side cover 321 is coupled to a secondary board 325 (e.g., a RF board, a printed circuit board, etc.) that is configured to carry a wire hub 401. The secondary board 325 is coupled to an inner surface of the side cover 321. The wire hub 401 is configured to electrically connect wires, connectors, or a wire bundle to the battery assembly 205.

As shown, the side cover 321 can be formed with an inner gap 327 configured to enable wires or a wire bundle in a wire channel 329 to pass through. The wire channel 329 is configured to accommodate and protect wires/connectors in the hub apparatus 300 (e.g., wires between the secondary board 325 and the main circuit board 203, power/signal lines between components, etc.). In some embodiments, the wire channel 329 is configured to prevent the wires positioned therein from rotating with the wheel (e.g., the rotor assembly). In some embodiments, the wire channel 329 can be positioned inside the shaft 309.

As shown in FIG. 4, the side cover 321 includes first, second, and third terminal ends 331a, 331b and 331c or wires. In the illustrated embodiments, the first and second terminal ends 331a, 331b are coupled to positive (+) and negative (−) terminals/nodes of the battery assembly 205, respectively. In the illustrated embodiments, the third terminal end 331c is also coupled to the battery assembly 205 and is configured to receive or transmit a signal for detecting/measuring the status (e.g., Status of Charge (SOC), Status of Health (SOH), etc.) of the battery assembly 205. In some embodiments, the third terminal end 331c can be coupled to other components of the hub apparatus 300. The terminal ends 331a, 331b and 331c or wires shown in FIGS. 4-7 are elongated only for illustration purposes. In some embodiments, the lengths of the terminal ends 331a, 331b and 331c or wires can be shorter than shown. In some embodiments, the terminal ends 331a, 331b and 331c or wires can be positioned in the wire channel 329.

Figure 5:
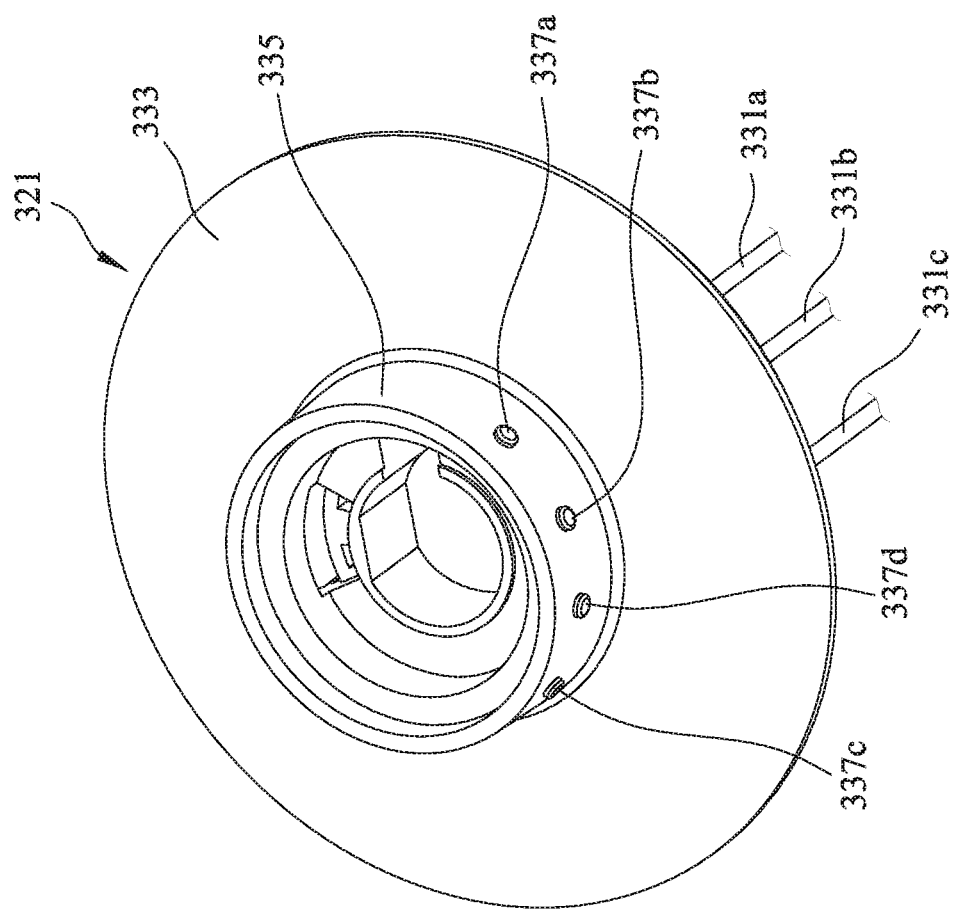
FIG. 5 is a partially isometric view of a side cover in accordance with embodiments of the present technology.

FIG. 5 is an isometric view of the side cover 321 in accordance with embodiments of the present technology. The side cover 321 includes a base portion (or disk portion) 333 and a mating portion (or circular portion/flange) 335 extending from the base portion 333. In the illustrated embodiments, first, second, third, and fourth contact portions (or pin connectors/contacts) 337a-d are positioned around a circumference of the mating portion 335. The first, second, and third contact portions or pin connectors 337a-c are coupled to the terminal end 331a-c, respectively. In some embodiments, a "contact portion" and a corresponding "terminal end" are collectively named as a "connector."

In some embodiments, the first connectors 331a, 331b can be charging connectors configured to charge the hub apparatus (e.g., element 100, 200 or 300). The second connector 331c can be a signal connector. The third connector 331d can be a connector for facilitating the connection between the side cover 321 and a charging head (see, e.g., FIG. 10 or 11). Each of the connectors includes a contact portion and a terminal end, as described above.

In some embodiments, the first contact portion 337a is configured to couple to a positive (+) terminal/node of a wired charger. The second contact portion 337b is configured to couple to a negative (−) terminal/node of the wired charger. The third contact portion 337c is configured to couple internal circuitry within the hub apparatus to an external device (e.g., a computer, a smartphone, a workstation, etc.) that can be used to control, maintain, or configure the hub apparatus 300. In the illustrated embodiment, the third contact portion 337c is also configured to couple to the external device.

The third contact portion 337c is configured to receive signals from the external device for controlling a process associated with the hub apparatus (e.g., a charging process). In some embodiments, the signal can be a controlling signal from an external device (e.g., a smartphone, a portable device, etc.). The signal can be used to control, maintain, or configure the hub apparatus. In some embodiments, the signal can be indicative of whether the other connectors are properly connected. For example, the third contact portion 337c can receive signals to (1) control the charging speed based on the state of charge (SoC) of the battery assembly 205 and/or (2) cut off an electricity supply when the battery assembly 205 is fully charged or when the third contact portion 337c is not properly connected.

In some embodiments, the hub apparatus can be coupled to one or more external devices via a Wi-Fi and/or Bluetooth module positioned on the secondary board 325. In this way, the external device (e.g., smartphone, mobile device, computer, workstation, etc.) can be used to control, maintain or configure the hub apparatus.

In some embodiments, the fourth contact portion 337d is configured to facilitate connection between the side cover 321 and a charger (or a charging head). For example, the fourth contact portion 337d can include a magnet that attracts a metal portion of the charger. In some embodiments, the fourth contact portion 337d can include a metal portion that can be attracted by a magnet of the charger. In some embodiments, the contact portion 337 can include an elastic component/structure or a spring configured to facilitate the connection between the side cover 321 and the charger. Such embodiments are discussed below with reference to FIGS. 19-21.

In the illustrated embodiments, the first, second, third, and fourth contact portions 337a-d are positioned on the flange 335 of the side cover 321. In other embodiments, however, the first, second, third, and fourth contact portions 337a-d can be arranged/positioned in various ways. For example, in some embodiments, the third contact portion 337c can be positioned at a location between the first and second contact portions 337a, 337b.

Figure 6:
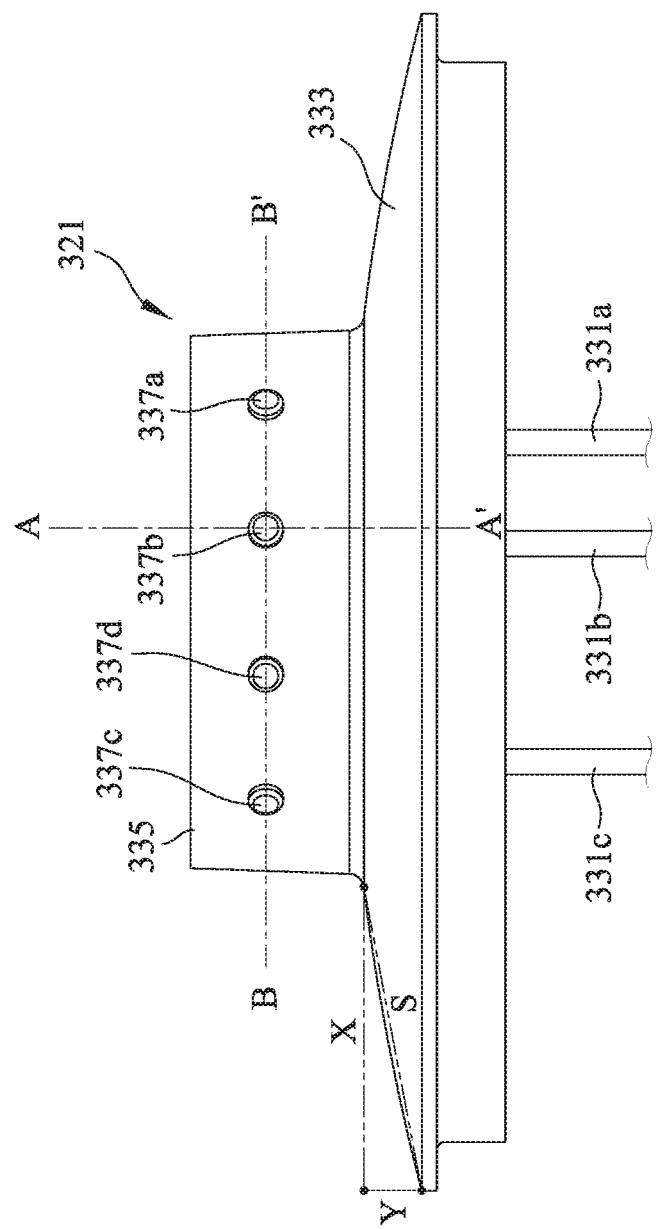
FIG. 6 is a side view of a mating portion (or a flange) extending outwardly from a base portion of a side cover in accordance with embodiments of the present technology. The mating portion includes a number of electrical contact portions therein.

FIG. 6 is a side view of the mating portion 335 extending outwardly from the side cover 321 in accordance with embodiments of the present technology. As shown, the base portion 333 is formed with a slope S (S=Y/X) from an edge of the mating portion 335 to an edge of the base portion 333. In the illustrated embodiments, the base portion 333 is formed with a curved or sloped surface. In other embodiments, the base portion 333 can be formed with a generally-flat surface.

Figure 7:
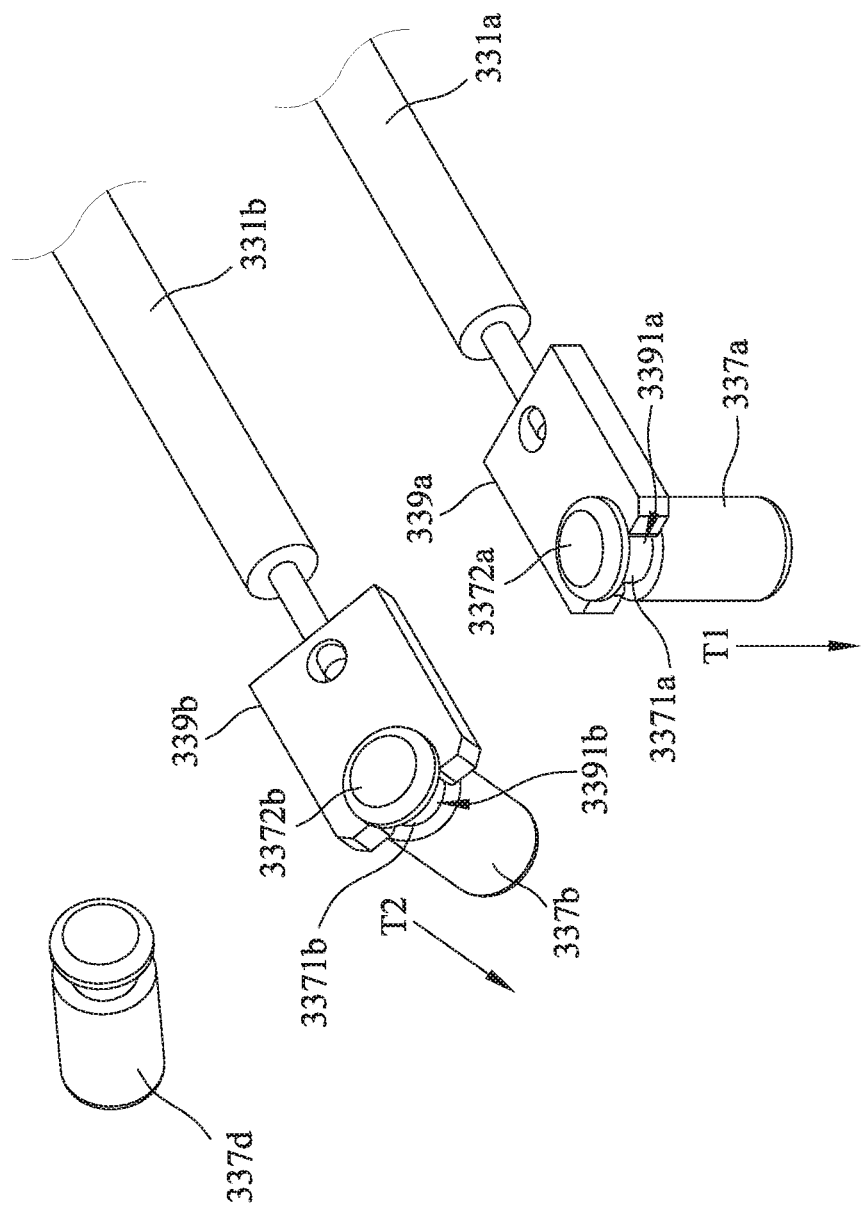
FIG. 7 is a partially isometric view of a connecting structure or clip in accordance with embodiments of the present technology.

FIG. 7 is an isometric view of a connecting structure 339 or clip (shown as 339a and 339b in FIG. 7) that makes an electrical connection between the contact portions 337 and the terminal ends 331 connected to the batteries in accordance with embodiments of the present technology. In the embodiment shown, each contact portion 337 is formed as a round post with a circumferential slot on one end with an end cap 3372 (shown as 3372a and 3372b in FIG. 7). The clip or connecting structure 339 includes a semi-circular recess that shapes into the slot of the contact portion 337 to make an electrical connection between both parts. The terminal ends 331 are soldered or otherwise secured in a hole at the other end of the connecting structure 339.

The connecting structure 339 is configured to connect a corresponding one of the terminal ends 331 and a corresponding one of the contact portions 337. As shown, the first terminal end 331a is coupled to an end of a first connecting structure 339a. At an opposite end of the first connecting structure 339a, a first pin opening 3391a (or a first pin recess) is formed to accommodate a neck portion 3371a of the first contact portion 337a. The first contact portion 337a includes a cap portion 3372a configured to be in contact with a (flat) surface of the first connecting structure 339a, so as to prevent (or at least partially restrain) the first contact portion 337a from moving in an axial direction (e.g., direction T1).

As also shown in FIG. 7, the second terminal end 331b is coupled to an end of a second connecting structure 339b. At an opposite end of the second connecting structure 339b, a second pin opening 3391b is formed to accommodate a neck portion 3371b of the second contact portion 337b. The second contact portion 337b includes a cap portion 3372b configured to be in contact with a (flat) surface of the second connecting structure 339b, so as to prevent (or at least partially restrain) the second contact portion 337b from moving in an axial direction (e.g., direction T2).

In the illustrated embodiments, as discussed above, the fourth contact portion 337d is configured to facilitate connecting the side cover 321 to a charger. For example, the fourth contact portion 337d can include a magnet that can attract a metal portion of the charger. Accordingly, the fourth contact portion 337d is not coupled to any terminal end 331. In some embodiments, the contact portions 337 can be formed in a substantially-the-same shape for the ease of manufacture or maintenance. In some embodiments, the contact portions 337 can be made of different conductive materials such that individual contact portions can have different characteristics or functions.

Figure 8:
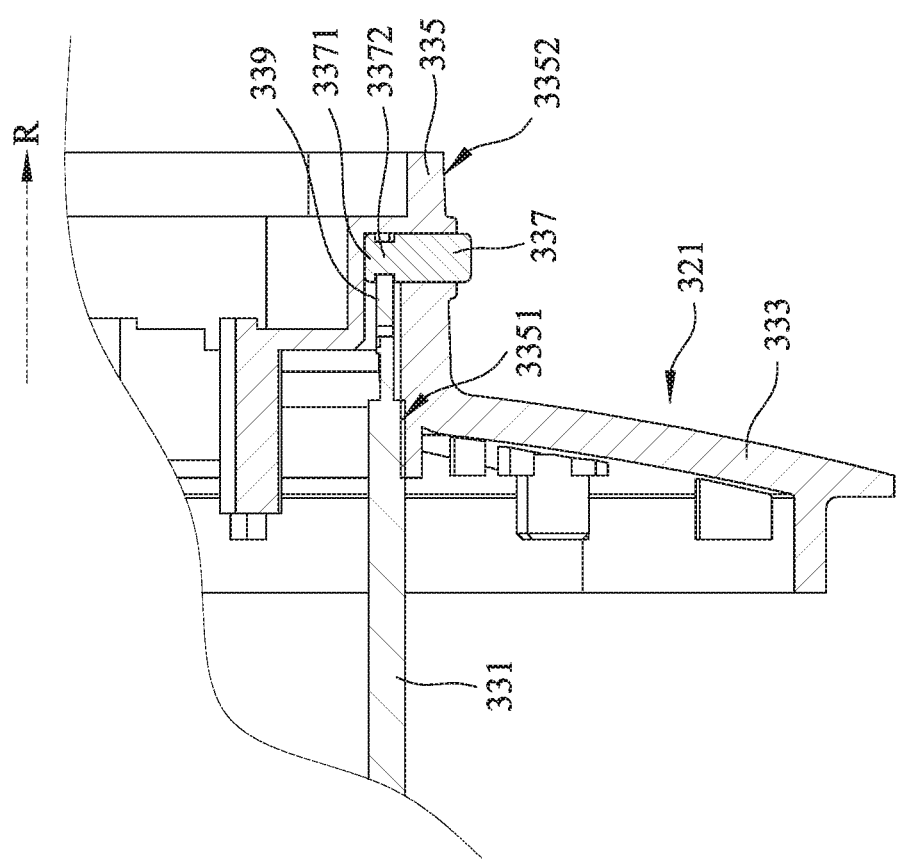
FIG. 8 is a partially cross-sectional view of a side cover illustrating how a clip connects to a contact portion in the mating portion in accordance with embodiments of the present technology.

FIG. 8 is a cross-sectional view (e.g., Section A-A' indicated in FIG. 6) of the side cover 321 in accordance with embodiments of the present technology. A contact portion 337 (e.g., the second contact portion 337b), a terminal end 331 (e.g., the second terminal end 331b), a connecting structure 339 (e.g., the second connecting structure 339b) are shown in FIG. 8. The contact portion 337 is positioned in a hole of the mating portion 335 (of the side cover 321). An internal wall of the side cover 321 prevents the contact portion 337 from being pushed further inwards into the center of the side cover 321. The recess (e.g., pin recess 3391 in FIG. 7) in the connecting structure 339 snaps over the slot in the contact portion 337 such that the head part (e.g., cap portion 3372) of the contact portion 337 cannot be pulled through the connecting structure 339. Therefore, the contact portion 337 is held in the hole in the side cover 321.

In the illustrated embodiments, the terminal end 331 is coupled to the connecting structure 339 and is in contact with an inner surface 3351 of the mating portion 335. Contacting the mating portion 335 provides structural support for the terminal end 331 and the connecting structure 339, and accordingly the overall rigidity of the components increases.

As shown in FIG. 8, the contact portion 337 is positioned on a side circumferential surface 3352 of the mating portion 335 of the side cover 321. As also shown, the terminal end 331 is positioned on an opposite side surface (e.g., the inner surface 3351) of the mating portion 335.

Figure 9:
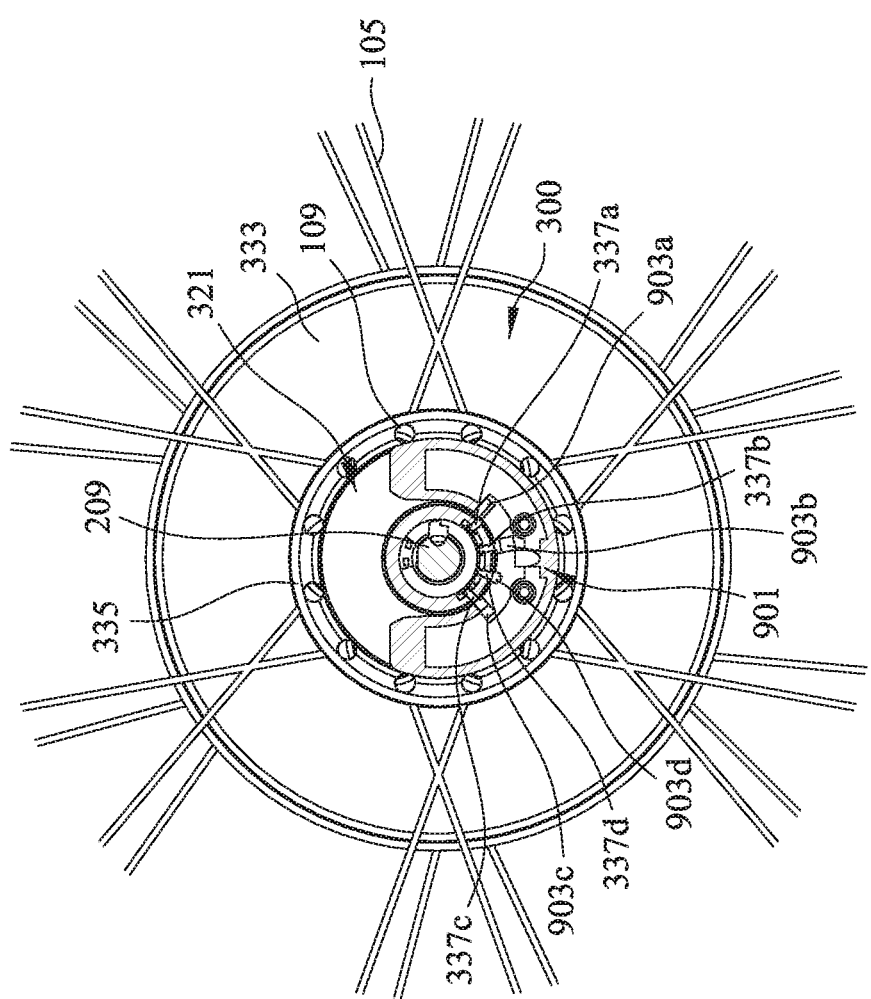
FIG. 9 is a partially cross-sectional view of contact portions and a side cover in accordance with embodiments of the present technology.

FIG. 9 is a cross-sectional view (e.g., Section B-B' indicated in FIG. 6) of the contact portions 337a-d and the side cover 321 in accordance with embodiments of the present technology. As shown, the contact portions 337a-d are positioned to be coupled to a charging head 901. The charging head 901 includes four contacting points 903a-d configured to couple to a corresponding one of the contact portions 337a-d so as to perform a predetermined function (e.g., supplying charging power, data transmission, electrically coupling two components, etc.).

For example, the first and second contact portions 337a, 337b are coupled to the contacting points 903a, 903b, respectively, such that a battery assembly (e.g., the battery assembly 205) inside the hub apparatus 300 can be charged. The contacting point 903d is coupled to the fourth contact portion 337d by a magnetic force such that the charging head 901 can be operably attached to the side cover 321. The contacting point 903c is coupled to the third contact portion 337c for enabling the communication (e.g., by transmitting signals) between the hub apparatus 300 and an external device via the charging head 901.

Figure 10:
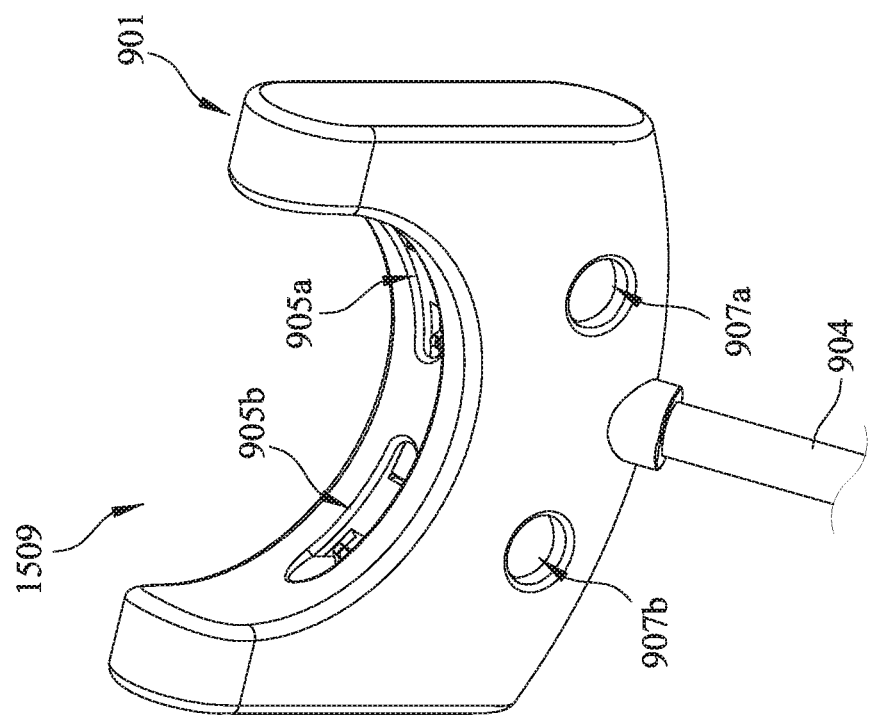
FIG. 10 is a partially isometric view of a charging head in accordance with embodiments of the present technology.

FIG. 10 is an isometric view of the charging head 901 in accordance with an embodiment of the present technology. As shown, the charging head 901 is coupled to an external power source or an external device via a wire channel 904

(e.g., having a wire bundle positioned therein). The wire channel 904 is configured to accommodate or protect wires coupled to the hub apparatus 300 (e.g., wires coupled to the contacting points 903a-c and the contact portions 337a-c).

As shown, the charging head 901 is formed with a semi-circular opening 1509 corresponding to the shape of the side cover 321. In the illustrated embodiments, the charging head 901 can include two oval-shaped openings 905a, 905b configured to enable the contact between the contact portions 337a-d in the side cover 321 and the contacting points 903a-d of the charging head 901. In the illustrated embodiments, the first and second contact portions 337a, 337b (which are configured to receive charging power) are positioned in the same opening (e.g., opening 905a), whereas the rest of the contact portions 337c, 337d are positioned in the other opening (opening 905b). Without being bound by theory, such an arrangement can effectively prevent or reduce communication interference to data or signals transmitted via the charging head 901 during a charging process.

As also shown in FIG. 10, the charging head 901 is formed with two receiving openings 907a, 907b. Each of the receiving openings 907a, 907b is configured to receive a connecting member such that the charging head 901 can be coupled to a charging stand (see e.g., FIG. 13).

Figure 11:
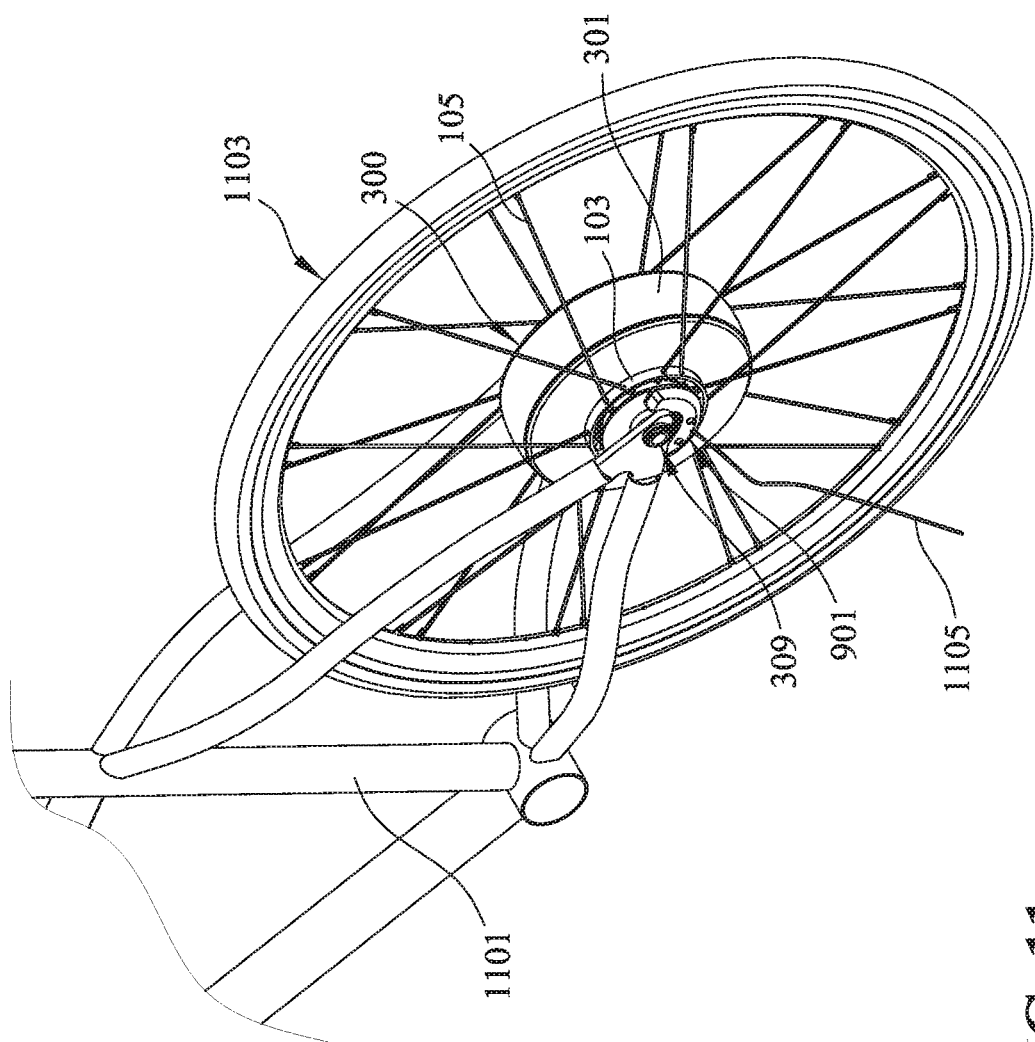
FIG. 11 is a partially isometric view of a vehicular frame supporting a hub apparatus and a charging head in accordance with embodiments of the present technology.

FIG. 11 is an isometric view of a vehicular frame 1101 supporting the hub apparatus 300 and the charging head 901 in accordance with embodiments of the present technology. As shown, the shaft 309 of the hub apparatus 300 is fixedly coupled to the vehicular frame 1101. The housing assembly 301 of the hub apparatus 300 is coupled to a wheel 1103 via the spokes 105 and the ring structure 103. The wheel 1103 can be rotated by the hub apparatus 300 to move the vehicular frame 1101. When the wheel 1103 is not rotating, the charging head 901 can be coupled to the hub apparatus 300 and charge the same. In some embodiments, the charging head 901 can be coupled to the hub apparatus 300 by a magnetic force (e.g., generated between the contacting point 903d and the fourth contact portion 337d, as discussed above). As shown, the charging head 901 can be coupled to an external power source via a wire 1105.

Figure 12:
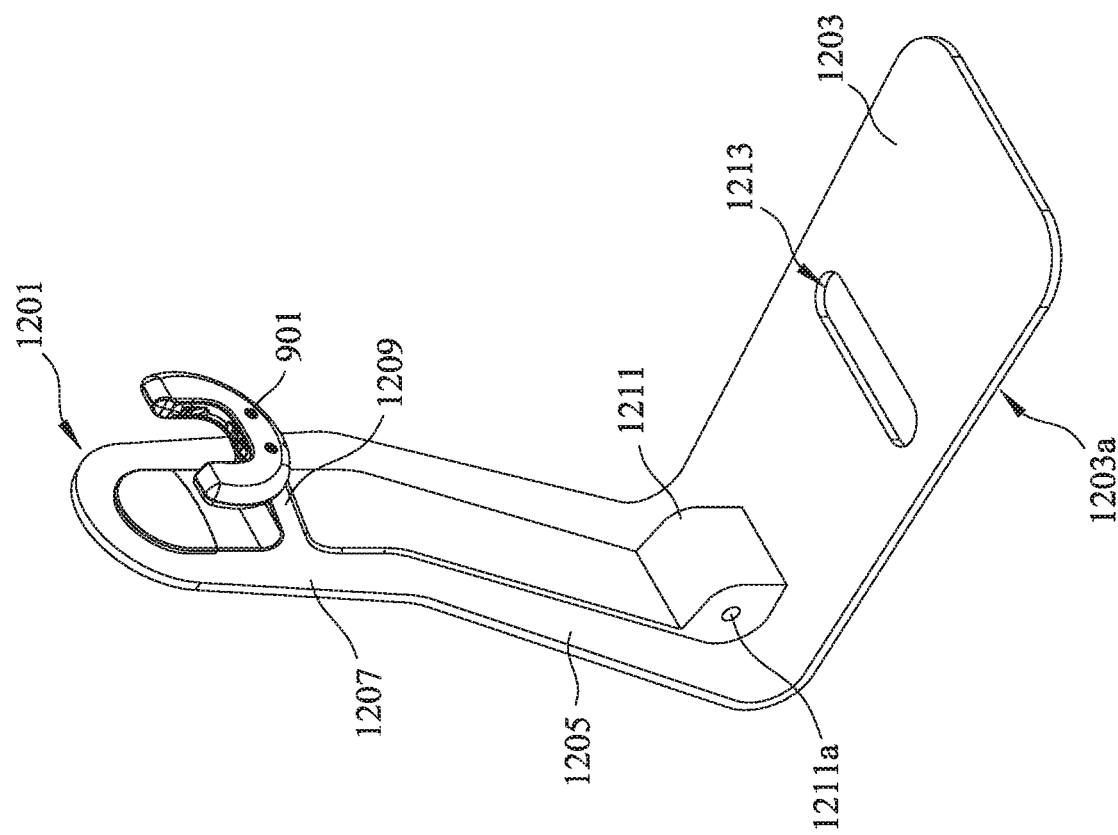
FIG. 12 is a partially isometric view of a charging stand in accordance with an embodiment of the present technology.

FIG. 12 is an isometric view of a charging stand 1201 in accordance with an embodiment of the present technology. The charging stand 1201 is configured to support/position the charging head 901 and a hub apparatus (e.g., the hub apparatus 300) coupled to a vehicle structure (e.g., the vehicular frame 1101). In some embodiments, when the hub apparatus is charged by the charging head 901, the charging stand 1201 supports the hub apparatus at a proper location. For example, the hub apparatus can be elevated by the charging stand 1201 and accordingly the wheel coupled to hub apparatus is not in contact with a ground surface.

The charging stand 1201 includes a base or foot portion 1203, a tilted portion or neck portion 1205, and a vertical portion or head portion 1207 extending from the neck portion 1205. The base 1203 is configured to position the charging stand 1201 on a floor or ground surface. In some embodiments, the base 1203 can include a material that provides sufficient friction between a bottom surface 1203a (e.g., make the bottom surface 1203a a "rough" surface) and a floor surface FS. The titled portion 1205 is configured to couple the base 1203 to the vertical portion 1207.

The charging stand 1201 includes a hollow arm 1209 configured to couple the vertical portion 1207 and the charging head 901. The hollow arm 1209 is also configured to accommodate one or more wires coupled to the charging head 901. In some embodiments, the wires can be further positioned in a space inside the tilted portion 1205 and/or in a space inside the vertical portion 1207.

As shown, the charging stand 1201 can include an angled support structure 1211 positioned to support the titled portion 1205. In some embodiments, the angled support structure 1211 can be formed with a gap 1211a configured to act as a shock absorbent or damper when the titled portion 1205 is moved relative to the base 1203. In some embodiments, the gap 1211a can be filled with elastic materials (e.g., forming a rubber bumper) to absorb shocks applied to the charging stand 1201. In some embodiments, the gap 1211a can be used as an outlet of the one or more wires positioned inside the neck portion 1205. As shown in FIG. 12, the base 1203 can be formed with a slot 1213 configured to position or accommodate a wheel (see e.g., FIG. 14).

Figure 13:
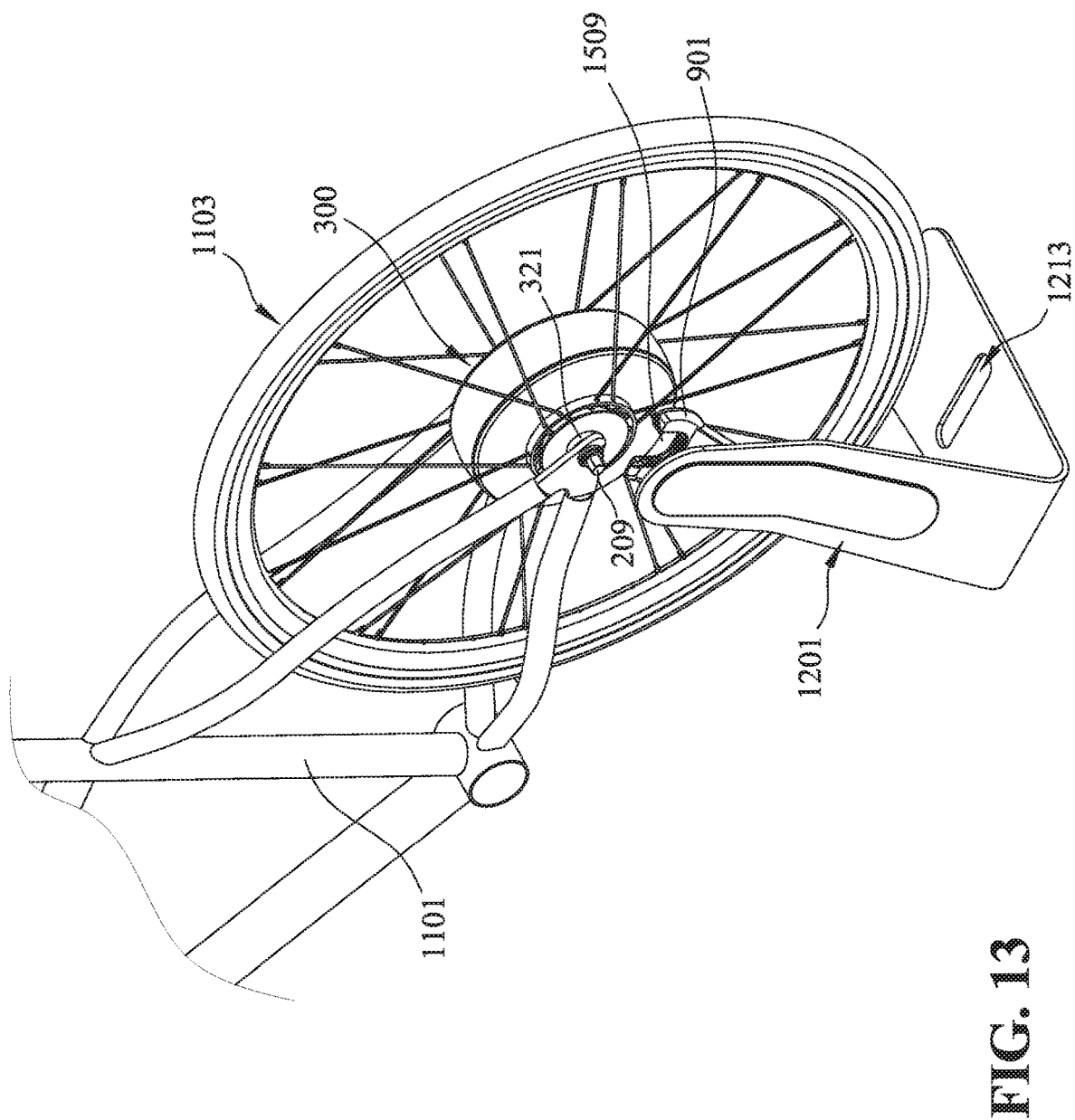
FIGS. 13 and 14 illustrate how a hub apparatus is coupled to a charging head and supported by the charging stand.
Figure 14:
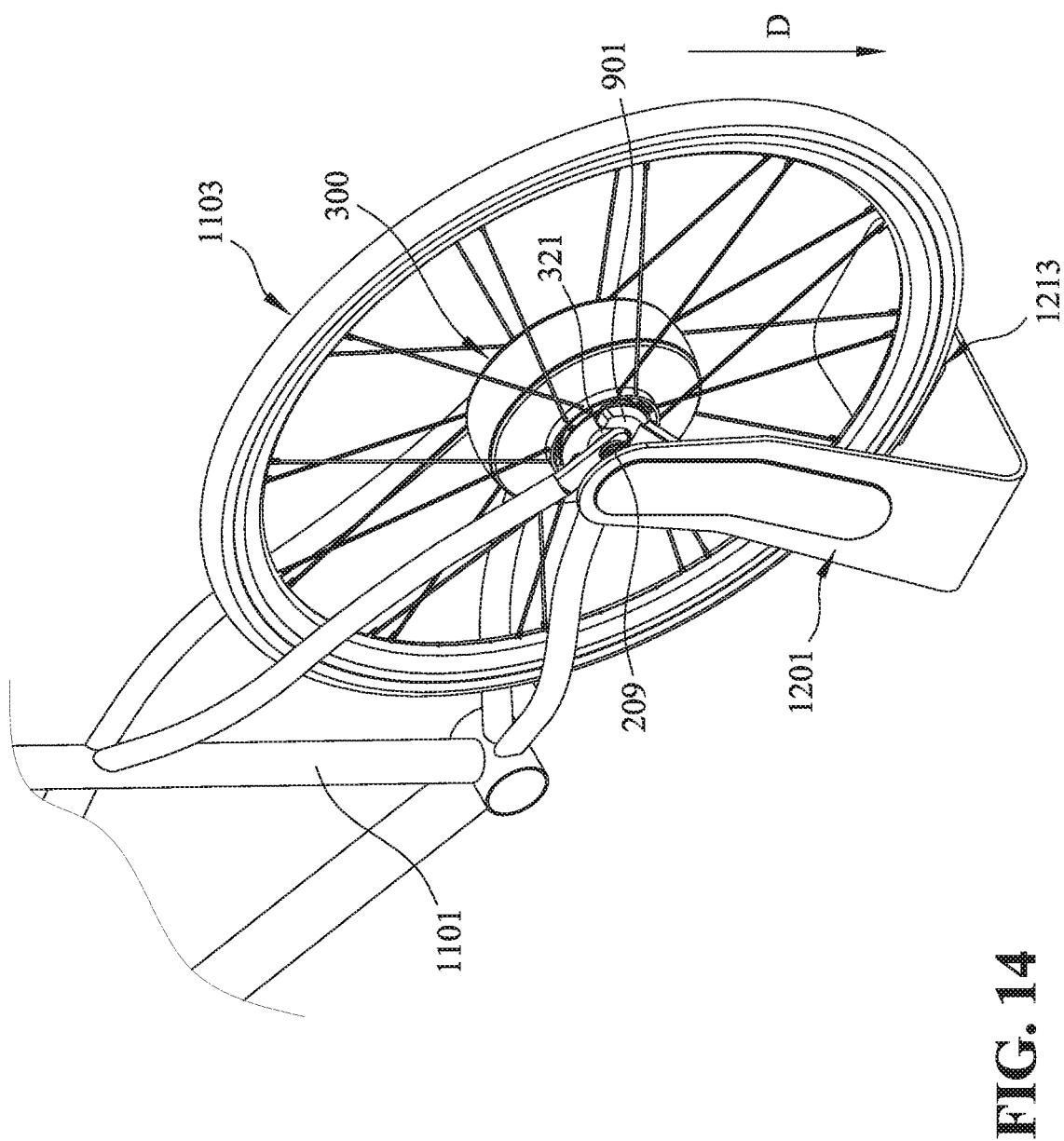

FIGS. 13 and 14 illustrate how the hub apparatus 300 is coupled to the charging head 901 and supported by the charging stand 1201. In FIG. 13, the side cover 321 of the hub apparatus 300 is aligned with the semi-circular opening 1509 formed by the charging head 901. In FIG. 14, the hub apparatus 300 can be moved downwardly (e.g., in direction D) and then the side cover 321 is positioned and fitted in the semi-circular opening 1509. The charging head 901 fits between the hub and a frame of a vehicle (e.g., the vehicular frame 1101), so that the vehicle does not fall out of the charging stand 1201.

As a result, the charging head 901 and the hub apparatus 300 are coupled and then the hub apparatus 300 can be charged via the charging head 901. As shown in FIG. 14, the wheel 1103 can be positioned in the slot 1213 to facilitate positioning the wheel 1103 at a proper location when the hub apparatus 300 is charged.

Figure 15:
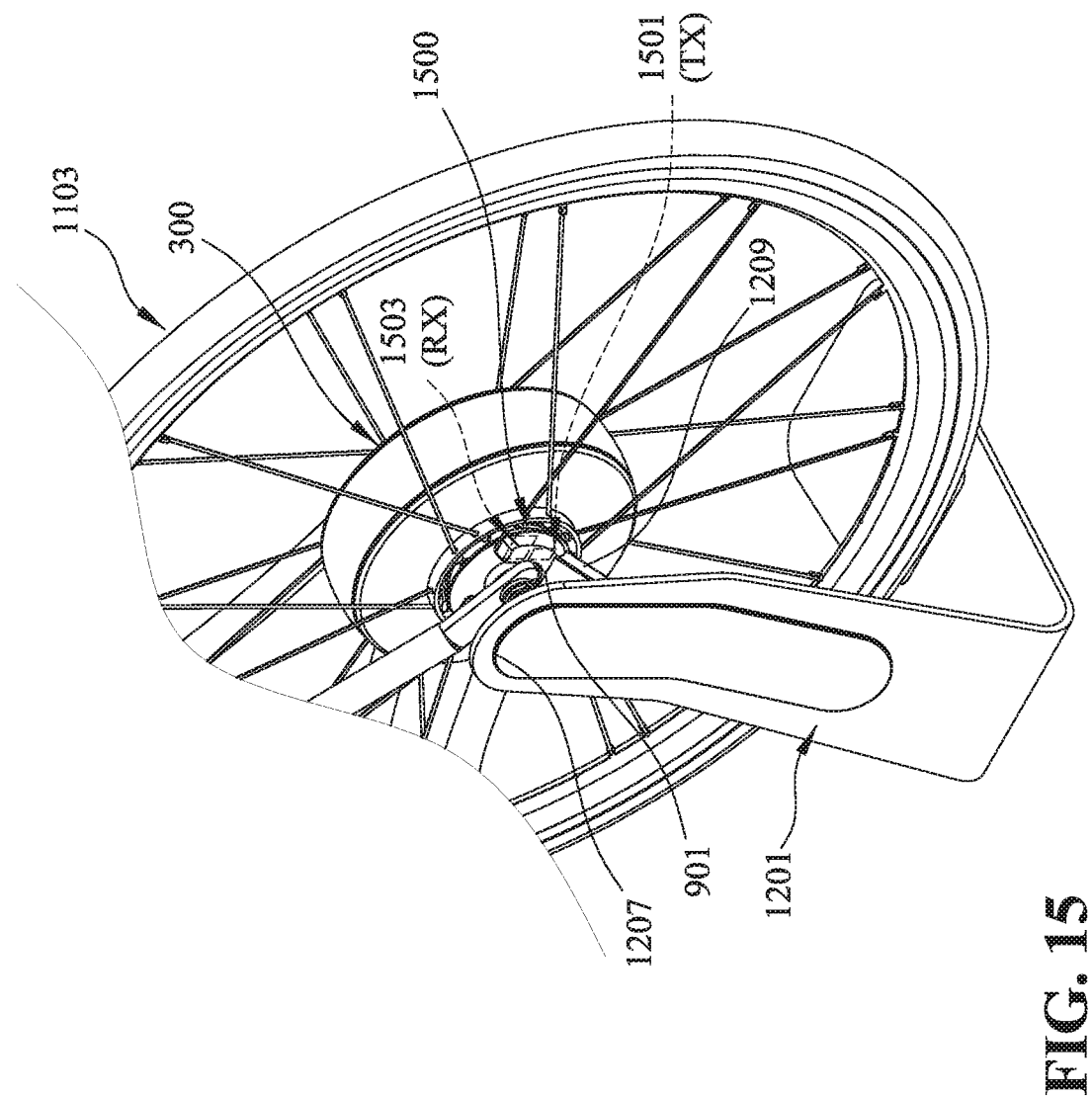
FIG. 15 illustrates how a charging head is incorporated into a charging stand in accordance with embodiments of the present technology.

FIG. 15 illustrates a wireless charging system 1500 in accordance with another embodiment of the present technology. The wireless charging system 1500 includes a power transmitting device/component 1501 and a power receiving device/component 1503. In some embodiments, the power transmitting device 1501 includes a transmitter (TX) configured to transmit power waves (e.g., RF waves) or a primary coil to generate alternating magnetic fields. The power receiving device 1503 includes a receiver (RX) or a secondary coil configured to receive the power waves transmitted from the transmitter or to respond to the generated magnetic fields. The RX can further use the received power to charge a battery.

In some embodiments, the wireless charging system 1500 includes a pair of resonant circuits that are turned to resonate at the same resonant frequency. One of the resonant circuits is positioned in the TX and the other is positioned in the RX. The TX includes an oscillator to generate RF waves at a resonant frequency by the resonant circuit at the TX. The generated RF waves can then be received by the resonant circuit at the RX. The RX includes a rectifier coupled to the resonant circuit at the RX. The rectifier is configured to transform the received RF waves into electrical current for charging a battery. In some embodiments, the TX and RX can have different designs or arrangements.

In some embodiments, the power transmitting device 1501 can include a controller (e.g., a chip, a control logic, a processor, etc.) configured to (1) detect the existence of the power receiving device 1503; (2) based on the detected power receiving device 1503, determine a suitable wireless/contactless/inductive charging protocol (e.g., "Qi" standard, "AirFuel Alliance" standard, "Magne Charge" standard, etc.) to perform a charging process; and (3) initiate the charging process based on the determined charging protocol.

In some embodiments, the controller can be further configured to (1) authenticate the hub apparatus 300 or the components therein (e.g., the power receiving device 1503); and (2) based on the result of the authentication, determine whether to perform a charging process. In some embodiments, the controller can be further configured to generate a signal and transmit the generated signal to a server or a user device, indicating the result of the authentication.

In some embodiments, the controller can be further configured to (1) receive information (e.g., battery usage information, battery status information, etc.) stored in a battery memory attached to a battery positioned in the hub apparatus 300; and (2) transmit the received information to a server or a user device.

In some embodiments, the controller can be further configured to communicate with the ECU carried by the main circuit board 203 of the hub apparatus 300. For example, the controller can provide firmware/software updates for the components (e.g., the battery assembly 205) of the hub apparatus 300.

As shown in FIG. 15, the power transmitting device 1501 is positioned in the charging head 901, and the power receiving device 1503 is positioned in the hub apparatus 300. In some embodiments, the power receiving device 1503 can be positioned on a board (e.g., the secondary board 325) coupled to the side cover 321 of the hub apparatus 300.

In some embodiments, the side cover 321 is made of a material (e.g., plastic) that does not substantially interfere with transmissions between the power transmitting device 1501 and the power receiving device 1503. In some embodiments, the charging head 901 can include a housing that is made of a material (e.g., plastic, resin, etc.) that does not substantially interfere with the transmission between the power transmitting device 1501 and the power receiving device 1503. As described above, the side cover 321 enables signal transmission/communication by a Wi-fi and/or Bluetooth module, which are coupled to, or carried by, the side cover 321 for communicating with an external device.

In some embodiments, the power transmitting device 1501 can be positioned on a surface of the charging head 901, at other locations such as inside the vertical portion 1207 or the hollow arm 1209 of the charging stand 1201. In some embodiments, the power receiving device 1503 can be positioned on a surface of the hub apparatus 300, incorporated in the housing assembly 301 of the hub apparatus 300, or other suitable locations.

Figure 16:
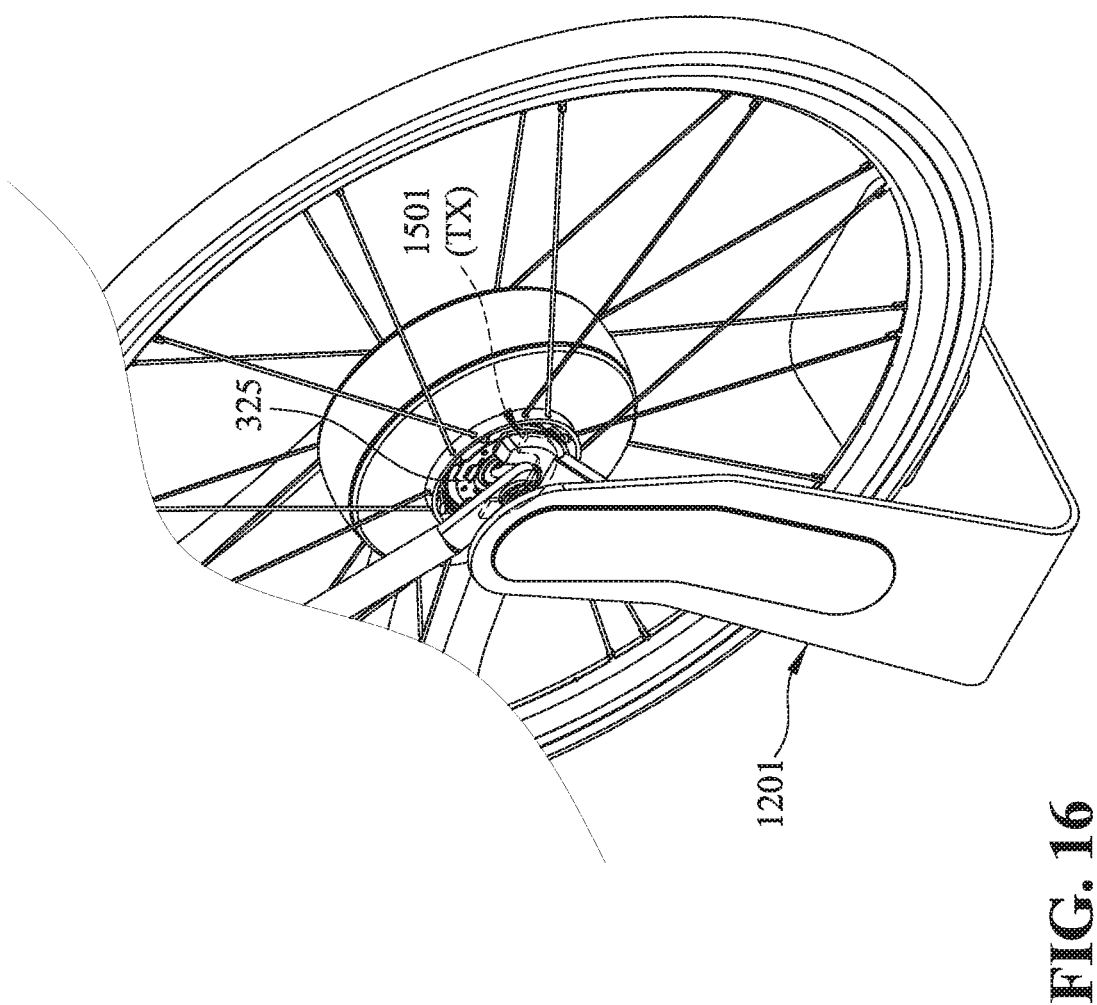
FIGS. 16-18 illustrate embodiments of a wireless charging system in accordance with the present technology.

FIG. 16 is an isometric view of an embodiment of the power transmitting device 1501. As shown, the power transmitting device 1501 has a flat structure and is configured to be positioned adjacent to the secondary board 325 (e.g., where the power receiving device 1503 is located, in some embodiments) of the hub apparatus 300. In some embodiments, the power transmitting device 1501 can be shaped in accordance with the secondary board 325. In some embodiments, the power transmitting device 1501 has a partially-circular-shaped flat structure. In some embodiments, the power transmitting device 1501 can have a crescent-shaped flat structure. The power receiving component 1503 can be positioned on or carried by the secondary board 325.

Figure 17:
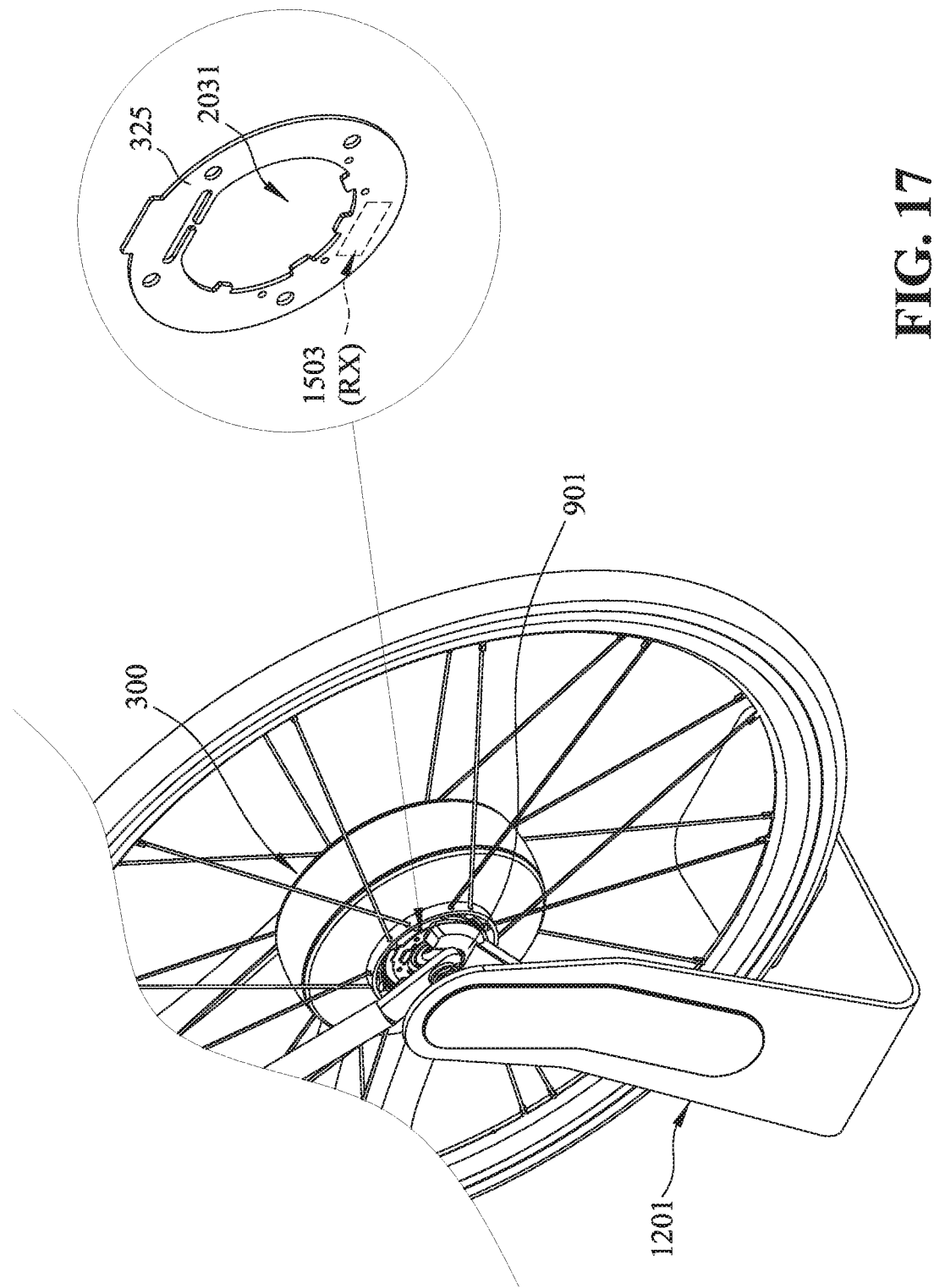

FIG. 17 is a schematic diagram showing the power receiving device 1503 in accordance with embodiments of the present technology. As shown, the power receiving device 1503 is positioned on a lower portion of the secondary board 325. In some embodiments, the power receiving device 1503 can be positioned at another portion (e.g., upper or side) of the secondary board 325. The secondary board 325 is formed with an opening 2031 to allow a shaft (e.g., the shaft 309) to pass. In some embodiments, the power receiving device 1503 can be formed with a shape corresponding to the opening 2031. In some embodiments, the power receiving device 1503 can be formed with a shape corresponding to the secondary board 325. In some embodiments, the power receiving device 1503 can be formed with a shape corresponding to the power transmitting device 1501.

Figure 18:
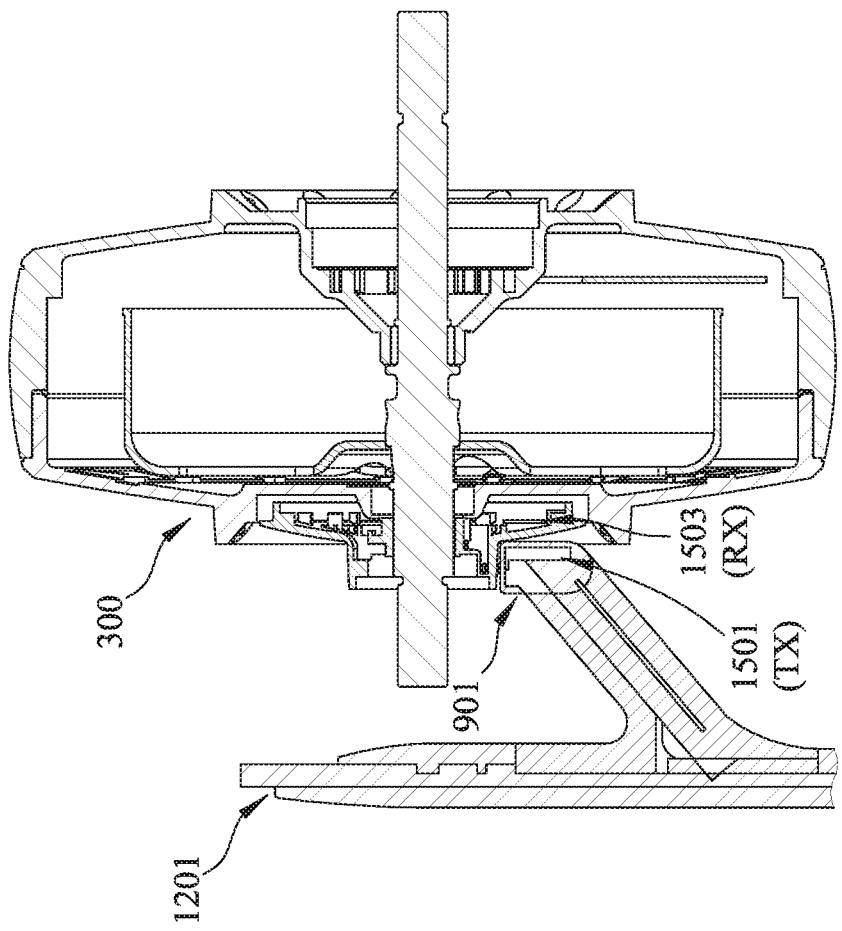

FIG. 18 is a schematic, cross-sectional view showing the power transmitting component 1501 and the power receiving device 1503 in accordance with embodiments of the present technology. As shown, the power transmitting component 1501 and the power receiving device 1503 are generally positioned in parallel to each other. In some embodiments, the power transmitting component 1501 and the power receiving device 1503 can be positioned to form an angle.

Advantages of the present wireless and wired chargers include, for example, (1) enabling a user to select a convenient way to charge, either by a wired charger or a wireless charger; and (2) providing chargers ready to use without opening or adjusting the hub apparatus (such that the hub apparatus can still be watertight, waterproof, airtight, etc. during and after charging).

Figure 19:
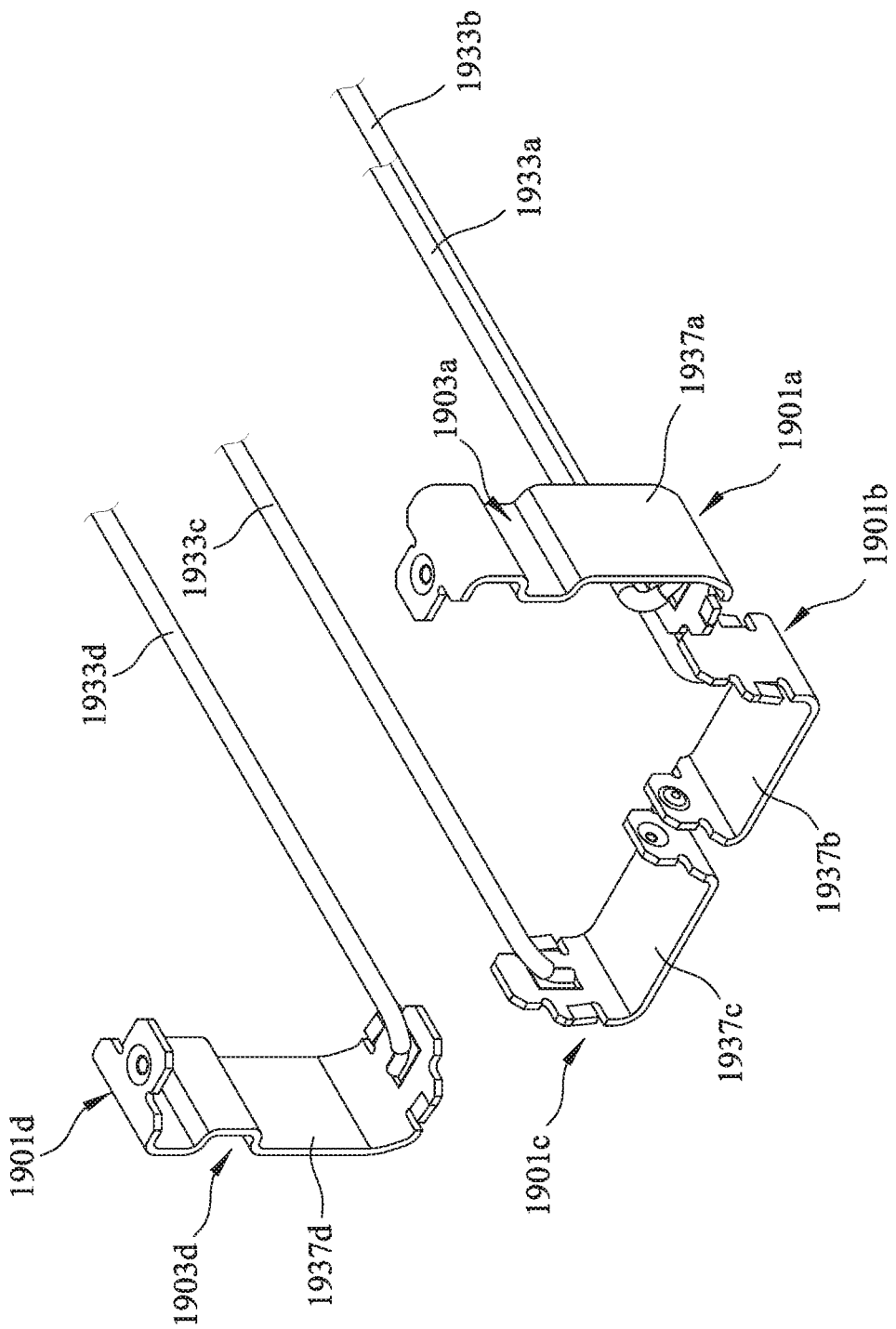
FIG. 19 illustrates a contact portion of a connector in accordance with embodiments of the present technology.

FIG. 19 illustrates connectors 1901a-d in accordance with an embodiment of the present technology. As shown, the connectors 1901a-d include contact portions 1937a-d and terminal ends (e.g., wires) 1933a-d, respectively. The terminal ends 1933a-d are coupled to a battery assembly (e.g., element 205) or a controller carried by a main circuit board (e.g., element 203) of a hub apparatus (e.g., element 100, 200, or 300). In some embodiments, the terminal ends 1933a, 1933d are coupled to the battery assembly, and the terminal ends 1933b, 1933c are coupled to the controller (for testing, information exchanging, etc.).

Figure 21:
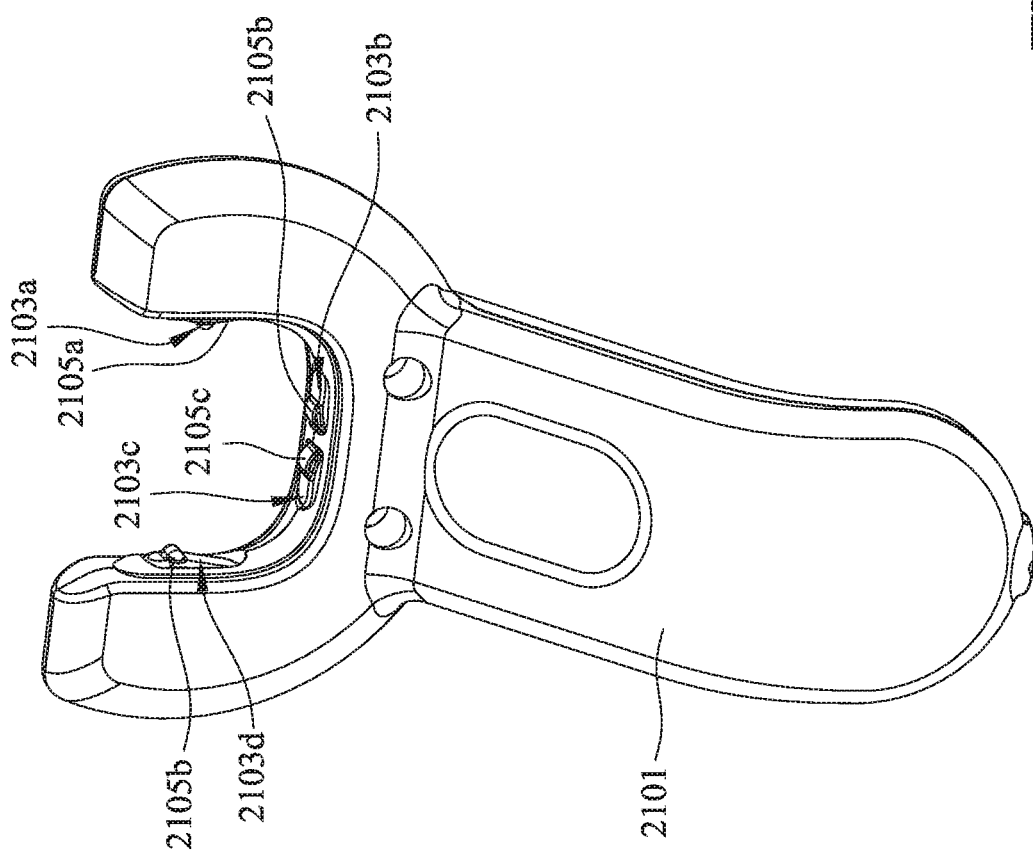
FIG. 21 illustrates a charging head with contacting points to mate with the side cover shown in FIG. 20 in accordance with embodiments of the present technology.

In some embodiments, one or more of the contact portions 1937a-d can be a spring contact configured to electrically couple to a corresponding contact point. In some embodiments, the spring contact can be shaped to provide a resilient force made for facilitating the electrical connection. For example, as shown in FIG. 19, the contact portion 1937a is formed with a female positioning structure (or a recess) 1903a configured to receive a male positioning structure (e.g., a protrusion) of a charging head (FIG. 21). Similarly, the contact portion 1937d is also formed with a female positioning structure (or a recess) 1903d configured to receive a male positioning structure (e.g., a protrusion) of the charging head. The male/female positioning structures are configured to facilitate the connection between the contact portions 1937a, 1937d and the charging head (FIG. 21).

Figure 20:
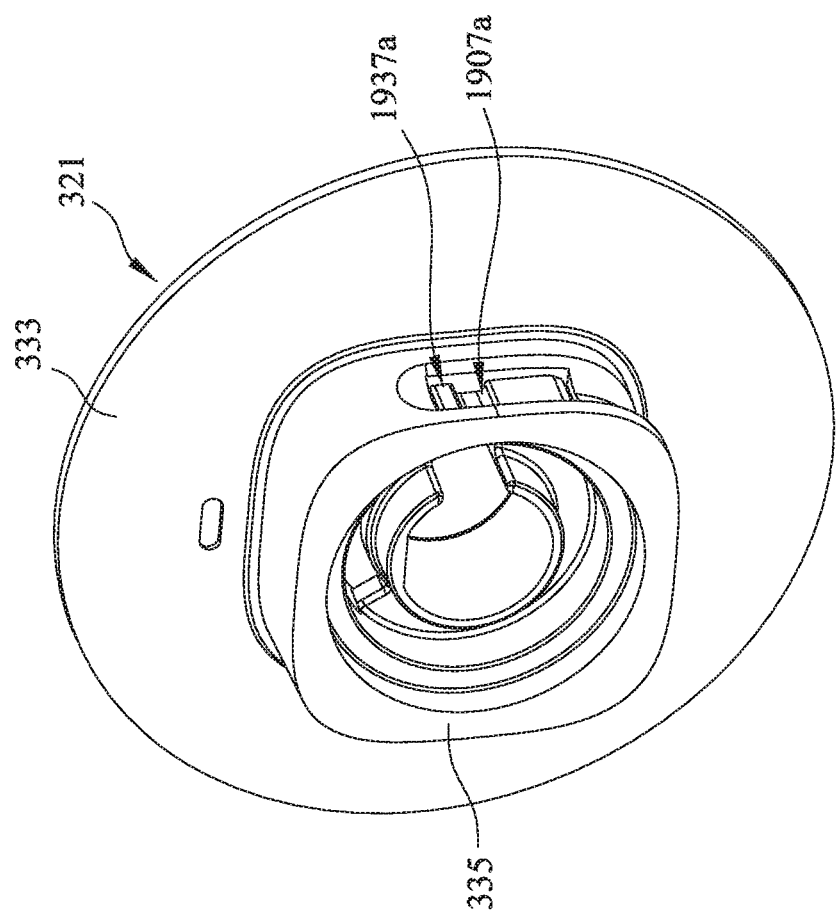
FIG. 20 illustrates a side cover of a hub motor with an electrical charging contact portions in accordance with another embodiment of the present technology.

FIG. 20 illustrates a side cover 321 in accordance with embodiments of the present technology. As shown, the side cover 321 includes a base portion 333 and a mating portion 335 extending from the base portion 333. The mating portion 335 is formed with an opening that enables the contact portion 1937a to pass such that it can be coupled with the corresponding contacting point 2103a.

Referring now to FIG. 21, a charging head 2101 is formed with four contacting points 2103a-d configured to couple with the contact portions 1937a-d, respectively. As shown in FIG. 21, the contacting points 2103a, 2103d are formed with male positioning structures (or protrusions) 2105a, 2105b. The male positioning structures 2105a, 2105b are configured to be received/positioned in the female positioning structures 1903a, 1903d, respectively, such that the charging connectors 1901*a*, 1901*d* are fittingly, fixedly coupled to the contacting points 2103*a*, 2103*d*.

As shown in FIG. 21, the contacting points 2103*b*, 2103*c* can also be formed with male positioning structures (or protrusions) 2105*b*, 2105*c* configured to contact the contact portions 1937*b*, 1937*c*. The male positioning structures 2105*b*, 2105*c* can ensure that the contacting points 2103*b*, 2103*c* are properly in contact with the contact portions 1937*b*, 1937*c*.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A hub apparatus, comprising:
a housing assembly defining an internal space;
a shaft positioned to extend through the housing assembly, the housing assembly being rotatably coupled to the shaft;
a stator assembly fixedly coupled to the shaft and positioned in the internal space, the stator assembly comprising a battery assembly including a plurality of battery packs circumferentially positioned about the shaft;
a side cover fixedly coupled to the shaft and rotatably coupled to the housing assembly, the side cover having a base portion and a mating portion extending from the base portion; and
a pair of first connectors positioned through the side cover, each of the first connectors comprising a terminal end and a contact portion, wherein the terminal end is electrically coupled to the battery assembly via a wire bundle fixedly coupled to the side cover, and wherein the contact portion is configured to electrically couple to an external power source so as to charge the battery assembly through a wired connection.

2. The hub apparatus of claim 1, wherein the side cover is coupled to the housing assembly via an oil seal or a bearing.

3. The hub apparatus of claim 1, wherein the contact portions are positioned on a side surface of the mating portion of the side cover, and wherein the terminal end is positioned on an opposite side surface of the mating portion.

4. The hub apparatus of claim 1, wherein the terminal end is electrically connected to a wire hub carried by a board coupled to an inner surface of the side cover, and wherein the wire bundle is configured to electrically couple the wire hub with the battery assembly.

5. The hub apparatus of claim 1, wherein the wire bundle is positioned in a wire channel, and wherein the wire channel is configured to pass through an inner gap of the side cover.

6. The hub apparatus of claim 1, further comprising a wireless charging component positioned between the side cover and the housing assembly, wherein the wireless charging component is carried by the side cover, and wherein the wireless charging component is configured to communicate with an external wireless charger so as to charge the battery assembly through a wireless connection.

7. The hub apparatus of claim 6, wherein the wireless charging component is carried by a board coupled to an inner surface of the side cover.

8. The hub apparatus of claim 1, further comprising at least one second connector configured to transmit a signal to a controller of the hub apparatus, wherein the at least one second connector is positioned through the side cover and comprises a terminal end and a contact portion.

9. The hub apparatus of claim 8, further comprising at least one third connector configured to facilitate a connection between the side cover and a charging head coupled to the external power source, wherein the at least one third connector is positioned through the side cover and comprises a terminal end and a contact portion.

10. The hub apparatus of claim 9, wherein at least one of the contact portions of the first, second and third connectors comprises a pin contact, and wherein the pin contact is coupled to a corresponding one of the terminal ends via a connecting structure.

11. The hub apparatus of claim 8, wherein at least one of the contact portions of the first and second connectors comprises a spring contact directly connected with the terminal end.

12. The hub apparatus of claim 11, wherein the spring contact is formed with a recess configured to receive a protrusion of a charging head so as to facilitate the connection between the side cover and the charging head.

13. A hub apparatus, comprising:
a housing assembly defining an internal space;
a shaft positioned to extend through the housing assembly, the housing assembly being rotatably coupled to the shaft;
a stator assembly fixedly coupled to the shaft and positioned in the internal space, the stator assembly comprising a battery assembly including a plurality of battery packs circumferentially positioned about the shaft;
a side cover fixedly coupled to the shaft and rotatably coupled to the housing assembly, the side cover having a base portion and a mating portion extending from the base portion; and
a wireless charging component positioned between the side cover and the housing assembly, wherein the wireless charging component is carried by the side cover, and wherein the wireless charging component is configured to communicate with an external wireless charger so as to charge the battery assembly through a wireless connection.

14. The hub apparatus of claim 13, wherein the wireless charging component is carried by a board coupled to an inner surface of the side cover.

15. The hub apparatus of claim 13, wherein the side cover is coupled to the housing assembly via an oil seal or a bearing.

16. The hub apparatus of claim 13, further comprising a pair of connectors positioned through the side cover, each of the connectors comprising a terminal end and a contact portion, wherein the terminal end is electrically coupled to the battery assembly via a wire bundle fixedly coupled to the side cover, and wherein the contact portion is configured to electrically couple to an external power source so as to charge the battery assembly through a wired connection.

17. The hub apparatus of claim 16, wherein:
the pair of connectors are first connectors coupled to positive and negative nodes of the battery assembly, respectively;
the hub apparatus further comprises at least one second connector configured to transmit a signal to a controller of the hub apparatus, wherein the at least one second connector is positioned through the side cover and comprises a terminal end and a contact portion; and the hub apparatus further comprises at least one third connector configured to facilitate a connection between the side cover and a charging head coupled to the external power source, wherein the at least one third connector is positioned through the side cover and comprises a terminal end and a contact portion.

18. The hub apparatus of claim 17, wherein at least one of the contact portions of the first, second and third connectors comprises a pin contact, and wherein the pin contact is coupled to a corresponding one of the terminal ends via a connecting structure.

19. The hub apparatus of claim 17, wherein at least one of the contact portions of the first and second connectors comprises a spring contact configured to facilitate a connection between the side cover and a charging head coupled to the external power source.

20. A charging system for charging a hub apparatus, the charging system comprising:
a charging stand; and
a charging head coupled to the charging stand, the charging head being formed with an opening configured to receive a mating portion of a side cover of the hub apparatus;
wherein a vehicular frame is fixedly coupled to a shaft of the hub apparatus, and wherein the hub apparatus includes a plurality of battery packs circumferentially positioned about the shaft;
wherein the charging head is configured to fittingly positioned between the vehicular frame and the side cover of the hub apparatus such that the hub apparatus is capable of being charged by the charging head via a wireless connection and a wired connection.

21. A wheel, comprising:
a tire;
a rim configured to support the tire; and
a hub apparatus configured to couple to the rim, the hub apparatus comprising—
a housing assembly defining an internal space;
a shaft positioned to extend through the housing assembly, the housing assembly being rotatably coupled to the shaft;
a stator assembly fixedly coupled to the shaft and positioned in the internal space, the stator assembly comprising a battery assembly including a plurality of battery packs circumferentially positioned about the shaft;
a side cover fixedly coupled to the shaft and rotatably coupled to the housing assembly, the side cover having a base portion and a mating portion extending from the base portion; and
a pair of first connectors positioned through the side cover, each of the first connectors comprising a terminal end and a contact portion, wherein the terminal end is electrically coupled to the battery assembly via a wire bundle fixedly coupled to the side cover, and wherein the contact portion is configured to electrically couple to an external power source so as to charge the battery assembly through a wired connection.

* * * * *